(12) United States Patent
Tinklenberg et al.

(10) Patent No.: US 12,536,712 B2
(45) Date of Patent: Jan. 27, 2026

(54) SYSTEMS AND ASSOCIATED METHODS FOR ARTIFICIAL INTELLIGENCE (AI)-BASED GENERATION OF IMAGE OF VIRTUAL OBJECT

(71) Applicants: Sony Interactive Entertainment LLC, San Mateo, CA (US); Sony Interactive Entertainment Inc., Tokyo (JP)

(72) Inventors: Bethany Tinklenberg, San Mateo, CA (US); Tatianna Forget, San Mateo, CA (US); Mahdi Azmandian, San Mateo, CA (US)

(73) Assignees: Sony Interactive Entertainment LLC, San Mateo, CA (US); Sony Interactive Entertainment Inc., Tokyo (JP)

( * ) Notice: Subject to any disclaimer, the term of this patent is extended or adjusted under 35 U.S.C. 154(b) by 204 days.

(21) Appl. No.: 18/410,798

(22) Filed: Jan. 11, 2024

(65) Prior Publication Data

US 2025/0232485 A1     Jul. 17, 2025

(51) Int. Cl.
   *G06T 11/00* (2006.01)
   *G06N 20/00* (2019.01)

(52) U.S. Cl.
   CPC .............. *G06T 11/00* (2013.01); *G06N 20/00* (2019.01); *G06T 2200/24* (2013.01)

(58) Field of Classification Search
   None
   See application file for complete search history.

(56) References Cited

U.S. PATENT DOCUMENTS

| 10,802,697 | B1 | 10/2020 | Robledo et al. |
| 2008/0256489 | A1 | 10/2008 | Maurer et al. |
| 2022/0028139 | A1 | 1/2022 | Mitra et al. |

OTHER PUBLICATIONS

Gu et al. (Image Processing Using Multi-Code GAN Prior, Computer Vision and Pattern Recognition, 2020) (Year: 2020).*
Abdal et al. (Image2StyleGAN: How to Embed Images Into the StyleGAN Latent Space?, Computer Vision and Pattern Recognition, 2019) (Year: 2019).*

(Continued)

*Primary Examiner* — Kyle Zhai
(74) *Attorney, Agent, or Firm* — Fish & Richardson P.C.

(57) ABSTRACT

An artificial intelligence (AI) engine generates a first image of a virtual object based on a first reference index specification of the virtual object. The AI engine generates a second image of the virtual object based on a second reference index specification of the virtual object. The AI engine generates an intermediate image of the virtual object based on an intermediate index specification of the virtual object that is automatically generated by AI-based interpolation between the first reference index specification of the virtual object and the second reference index specification of the virtual object. A composition slider control is generated that enables navigation from the first image of the virtual object through the intermediate image of the virtual object to the second image of the virtual object. The composition slider control is configured to direct display of a selected AI engine-generated image of the virtual object.

23 Claims, 13 Drawing Sheets

(56) References Cited

OTHER PUBLICATIONS

Github.com [online], "harskish / ganspace," upon information and belief, available no later than Apr. 6, 2020, retrieved on Jul. 24, 2025, retrieved from URL<https://github.com/harskish/ganspace>, 7 pages.

Harkonen et al., "GANSpace: Discovering Interpretable GAN Controls," CoRR, Submitted on Apr. 6, 2020, arXiv:2004.02546v1, 14 pages.

Harkonen et al., "GANSpace: Discovering Interpretable GAN Controls," Mar. 30, 2020, retrieved on Jul. 24, 2025, <https://www.youtube.com/watch?v=jdTICDa_eAI>, 35 pages (no transcript provided as document contains no sound).

International Search Report and Written Opinion in International Appln. No. PCT/US2024/052125, mailed on Jan. 27, 2025, 10 pages.

\* cited by examiner

| Control Interface for Virtual Object Composition Slider | | Create 221 | Save 223 | Reset 225 |
|---|---|---|---|---|
| Identification of the Virtual Object: | some noun 203 | | | |
| Extrapolation Before First Reference Index (AEI%): | #% 217 | | | |
| Extrapolation After Second Reference Index (PEI%): | #% 219 | | | |
| 205 Index Density: ⦿very low ○ low ○ medium ○ high ○ very high OR Index Total: | P | | | |

| 109 | First Reference Image: | filename | Browse 209 | Auto-Extract RI1spec 211 |
|---|---|---|---|---|
| 113 | Second Reference Image: | filename | Browse 213 | Auto-Extract RI2spec 215 |

| # | Listing of Attributes 207 Description  Weighting | | First Reference Index Specification (RI1spec) 103 | Second Reference Index Specification (RI2spec) 105 |
|---|---|---|---|---|
| 1 | d_1 | w_1 | RI1s_1 | RI2s_1 |
| 2 | d_2 | w_2 | RI1s_2 | RI2s_2 |
| 3 | d_3 | w_3 | RI1s_3 | RI2s_3 |
| ⋮ | ⋮ | ⋮ | ⋮ | ⋮ |
| Z | d_Z | w_Z | RI1s_Z | RI2s_Z |

Fig. 2

| Control Interface for Attribute-Level Sliders | | | | Apply 315 | Reset 319 |
|---|---|---|---|---|---|
| # | 207 Listing of Attributes Description  Weighting | | First Reference Index (RI1) for Attribute Base Specifications 303 | Second Reference Index (RI2) for Attribute Base Specifications | |
| 1 | d_1 | w_1 | 307-1  RI1ai_1  305-1   RI2ai_1  311-1  309-1  RI1s_1 | 313-1  RI2s_1 | 303-1 |
| 2 | d_2 | w_2 | 307-2  RI1ai_2  305-2   RI2ai_2  311-2  309-2  RI1s_2 | 313-2  RI2s_2 | 303-2 |
| 3 | d_3 | w_3 | 307-3  RI1ai_3  305-3   RI2ai_3  311-3  309-3  RI1s_3 | 313-3  RI2s_3 | 303-3 |
| ⋮ | ⋮ | ⋮ | ⋮ | ⋮ | |
| Z | d_Z | w_Z | 307-Z  RI1ai_Z  305-Z   RI2ai_Z  311-Z  309-Z  RI1s_Z | 313-Z  RI2s_Z | 303-Z |

Control Interface for Virtual Object Composition Slider — 201    [Create] 221   [Save] 223   [Reset] 225

| | | |
|---|---|---|
| Identification of the Virtual Object: | boat | 203 |
| Extrapolation Before First Reference Index (AEI%): | 10 % | 217 |
| Extrapolation After Second Reference Index (PEI%): | 20 % | 219 |

205   Index Density: ⦿ very low ○ low ○ medium ○ high ○ very high   OR Index Total: 7

| 109 | First Reference Image: | filename [Browse] 209 | [Auto-Extract RI1spec] 211 |
| 113 | Second Reference Image: | filename [Browse] 213 | [Auto-Extract RI2spec] 215 |

| # | Listing of Attributes 207<br>Description   Weighting | | First Reference Index<br>Specification (RI1spec) 103 | Second Reference Index<br>Specification (RI2spec) 105 |
|---|---|---|---|---|
| 1 | d_1 = style | w_1 = 20% | RI1s_1 = galleon | RI2s_1 = race |
| 2 | d_2 = hull | w_2 = 20% | RI1s_2 = wood | RI2s_2 = fiberglass |
| 3 | d_3 = power | w_3 = 20% | RI1s_3 = sail | RI2s_3 = outboard |
| 4 | d_4 = age | w_4 = 20% | RI1s_4 = ancient | RI2s_4 = modern |
| 5 | d_5 = size | w_5 = 20% | RI1s_5 = huge | RI2s_5 = sleek |

Fig. 5

Control Interface for Attribute-Level Sliders — 301    [Apply] 315   [Reset] 319

| # | 207<br>Listing of Attributes<br>Description   Weighting | | First Reference Index (RI1) for<br>Attribute Base Specifications   303 | Second Reference Index (RI2) for<br>Attribute Base Specifications | |
|---|---|---|---|---|---|
| 1 | d_1 = style | w_1 = 20% | 307-1   RI1ai_1   305-1<br>309-1<br>RI1s_1 = galleon | RI2ai_1   311-1<br>313-1<br>RI2s_1 = speed | 303-1 |
| 2 | d_2 = hull | w_2 = 20% | 307-2   RI1ai_2   305-2<br>309-2<br>RI1s_2 = wood | RI2ai_2   311-2<br>313-2<br>RI2s_2 = fiberglass | 303-2 |
| 3 | d_3 = power | w_3 = 20% | 307-3   RI1ai_3   305-3<br>309-3<br>RI1s_3 = sail | RI2ai_3   311-3<br>313-3<br>RI2s_3 = outboard | 303-3 |
| 4 | d_4 = age | w_4 = 20% | 307-4   RI1ai_4   305-4<br>309-4<br>RI1s_4 = ancient | RI2ai_4   311-4<br>313-4<br>RI2s_4 = new | 303-4 |
| 5 | d_5 = size | w_5 = 20% | 307-5   RI1ai_5   305-5<br>309-5<br>RI1s_5 = huge | RI2ai_5   311-5<br>313-5<br>RI2s_5 = sleek | 303-5 |

SYSTEMS AND ASSOCIATED METHODS FOR ARTIFICIAL INTELLIGENCE (AI)-BASED GENERATION OF IMAGE OF VIRTUAL OBJECT

BACKGROUND OF THE INVENTION

The video game industry has seen many changes over the years and has been trying to find ways to enhance the video game play experience for players and increase player engagement with the video games and/or online gaming systems, which ultimately leads to increased revenue for the video game developers and providers and the video game industry in general. It is within this context that implementations of the present disclosure arise.

SUMMARY OF THE INVENTION

In an example embodiment, a system is disclosed for AI-based generation of an image of a virtual object. The system includes a first reference index specification for generation of a first image of a virtual object. The system also includes a second reference index specification for generation of a second image of the virtual object. The system also includes a specification interpolation engine configured to automatically generate an intermediate index specification for generation of an intermediate image of the virtual object by interpolating between the first reference index specification and the second reference index specification. The system also includes an AI engine configured to generate the first image of the virtual object based on the first reference index specification. The AI engine is also configured to generate the second image of the virtual object based on the second reference index specification. The AI engine is also configured to generate the intermediate image of the virtual object based on the intermediate index specification. The system also includes a composition slider control that enables navigation from the first image of the virtual object through the intermediate image of the virtual object to the second image of the virtual object. The composition slider control includes a handle and a slider bar. The handle is slidable by a user along the slider bar. The slider bar has a plurality of indexes positioned along the slider bar. The plurality of indexes include a first reference index associated with the first reference index specification and the first image of the virtual object. The plurality of indexes also include a second reference index associated with the second reference index specification and the second image of the virtual object. The plurality of indexes also include at least one intermediate index respectively associated with a corresponding intermediate index specification generated by the specification interpolation engine and a corresponding intermediate image of the virtual object generated by the AI engine. The composition slider control is configured to direct display of a given image of the virtual object corresponding to a given one of the plurality of indexes along the slider bar at which the handle is currently positioned.

In an example embodiment, a method is disclosed for AI-based generation of an image of a virtual object. The method includes receiving a first reference index specification for generation of a first image of a virtual object. The method also includes receiving a second reference index specification for generation of a second image of the virtual object. The method also includes automatically generating an intermediate index specification for generation of an intermediate image of the virtual object by interpolating between the first reference index specification and the second reference index specification. The method also includes executing an AI engine to generate the first image of the virtual object based on the first reference index specification. The method also includes executing the AI engine to generate the second image of the virtual object based on the second reference index specification. The method also includes executing the AI engine to generate the intermediate image of the virtual object based on the intermediate index specification. The method also includes generating a composition slider control for navigation from the first image of the virtual object through the intermediate image of the virtual object to the second image of the virtual object. The composition slider control includes a handle and a slider bar. The handle is slidable by a user along the slider bar. The slider bar has a plurality of indexes positioned along the slider bar. The plurality of indexes includes a first reference index associated with the first reference index specification and the first image of the virtual object. The plurality of indexes also includes a second reference index associated with the second reference index specification and the second image of the virtual object. The plurality of indexes also includes at least one intermediate index respectively associated with a corresponding intermediate index specification generated by the specification interpolation engine and a corresponding intermediate image of the virtual object generated by the AI engine. The method also includes displaying a given image of the virtual object corresponding to a given one of the plurality of indexes along the slider bar of the composition slider control at which the handle of the composition slider control is currently positioned.

BRIEF DESCRIPTION OF THE DRAWINGS

FIG. 2 shows an example of a control interface through which the user-specified control inputs are provided to the system of FIG. 1, in accordance with some embodiments.

FIG. 3 shows an example of an attribute-level slider control interface provided by the system of FIG. 1, in accordance with some embodiments.

FIG. 4 shows a usage example of the control interface of FIG. 2, in accordance with some embodiments.

FIG. 5 shows the attribute-level slider control interface of FIG. 3 based on the user-specified inputs entered through the control interface in the example of FIG. 4, in accordance with some embodiments.

DETAILED DESCRIPTION OF THE INVENTION

Figure 1:
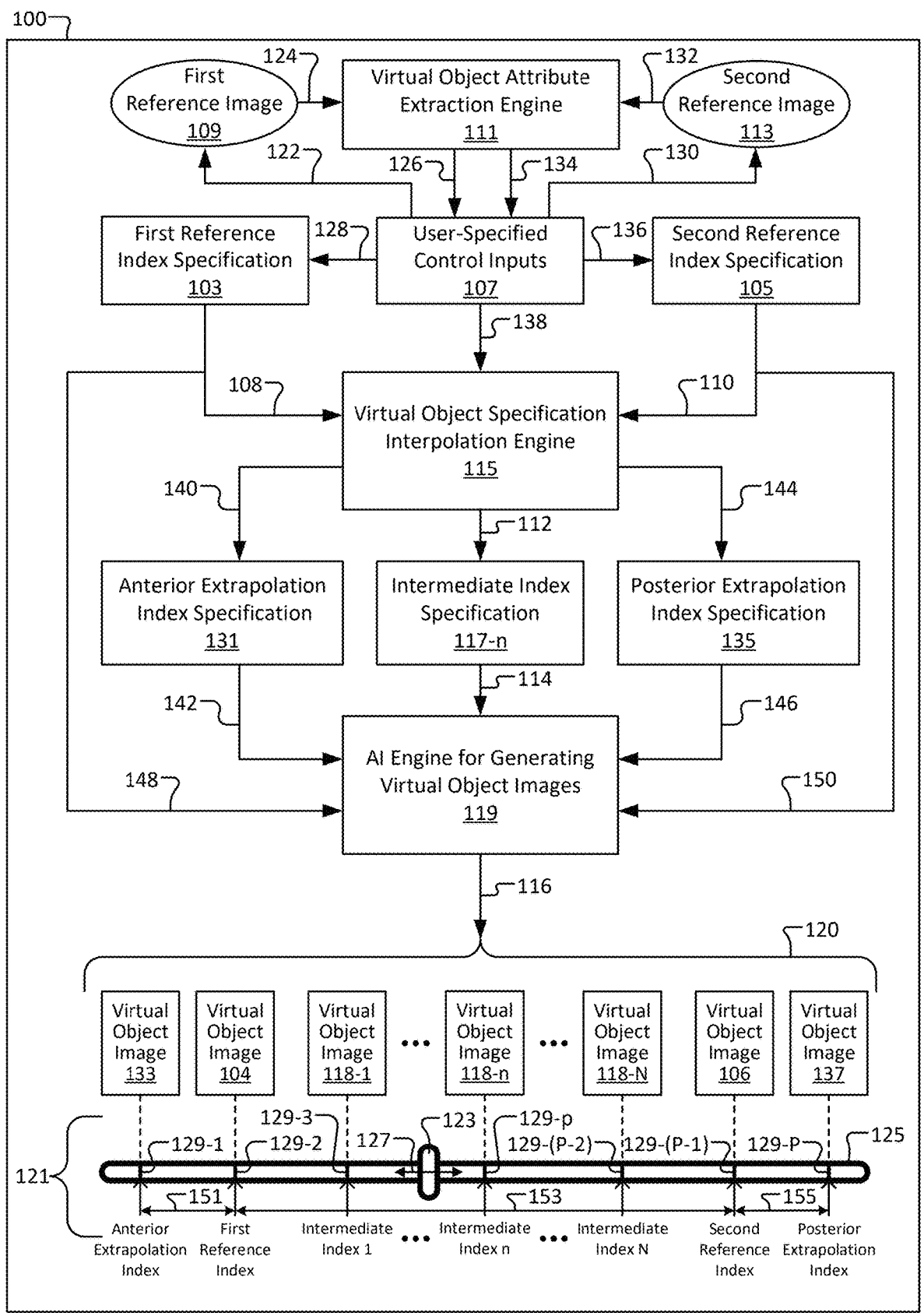
FIG. 1 shows a system for AI-based generation of an image of virtual object, in accordance with some embodiments.

In the following description, numerous specific details are set forth in order to provide a thorough understanding of the present disclosure. It will be apparent, however, to one skilled in the art that embodiments of the present disclosure may be practiced without some or all of these specific details. In other instances, well known process operations have not been described in detail in order not to unnecessarily obscure the present disclosure.

Many modern computer applications, such as video games, virtual reality applications, augmented reality applications, virtual world applications, etc., include many images of many different virtual objects (or virtual assets). For ease of description, the term "computer application" as used herein refers to any type of computer application in which images of virtual objects (or virtual assets) are displayed. For ease of description, the term "designer" as used herein refers to a real-world person that engages in the activity of creating images for virtual objects for use in computer applications. Also, for ease of description, the term "user" as used herein refers to a real-world person that utilizes the systems and methods disclosed herein for generating images of virtual objects.

Images of virtual objects are created by designers to fit the context of the computer application in which they will be displayed. The virtual objects can be essentially any noun, e.g., any person, place, or thing. It should be appreciated that there is an essentially limitless number of ways in which any given virtual object can be imagined, designed, specified, and imaged by a designer. For example, consider a particular context of a particular computer application that calls for display of a tree as a virtual object. In designing the virtual object for the tree, the designer is tasked with specifying many attributes of the tree, such as the height, the trunk shape, the trunk size, the canopy shape, the canopy size, the shapes of branches, the type of foliage, the type of bark, the color(s) of the bark, the color(s) of the branches, the color(s) of the foliage, the density of the foliage, the presence of fruit/berries/flowers/nuts/cones, the types of fruit/berries/flowers/nuts/cones, the shapes of the fruit/berries/flowers/nuts/cones, the sizes of the fruit/berries/flowers/nuts/cones, the colors of the fruit/berries/flowers/nuts/cones, the distribution of the fruit/berries/flowers/nuts/cones within the foliage, among other attributes. It should be appreciated that for many virtual objects, even the above-mentioned tree example, there are many attributes that define the virtual object and there are many different possible specifications for each of the many attributes, which can often result in enormous number of possible variations of the virtual object. The virtual object designer is challenged to create an image of a particular version or instance of a particular virtual object that coheres with a particular context of the computer application and that satisfies one or more visual objectives. In various embodiments, the visual objectives can include providing visual variety, promoting visual interest, attracting attention, conveying meaning, provoking emotion, inviting contemplation, stimulating user interaction with the computer application, among many other visual objectives. Therefore, it is of interest to develop automatic and/or semi-automatic ways to assist the designer with the design of virtual objects for use in computer applications. To this end, various systems and methods are disclosed herein by which a user, e.g., virtual object designer, can leverage artificial intelligence (AI) capabilities in assisting with generation of images of virtual objects for use in computer applications.

FIG. 1 shows a system 100 for AI-based generation of an image of virtual object, in accordance with some embodiments. The system 100 is operable by a designer to create targeted images of virtual objects through a systematic application of AI technology. The system 100 includes a first reference index specification 103 for generation of a first image 104 of a virtual object. The system 100 also includes a second reference index specification 105 for generation of a second image 106 of the virtual object. The system 100 also includes a specification interpolation engine 115 that receives the first reference index specification 103 as an input, as indicated by arrow 108, and that receives the second reference index specification 105 as an input, as indicated by arrow 110. The specification interpolation engine 115 is configured to automatically generate an intermediate index specification 117-$n$, for n=1 to n=N, where N is a positive non-zero integer, for generation of a corresponding intermediate image 118-$n$ of the virtual object by automatically interpolating between the first reference index specification 103 and the second reference index specification 105. The specification interpolation engine 115 outputs the intermediate index specification 117-$n$, for n=1 to n=N, as indicated by arrow 112. In some embodiments, the specification interpolation engine 115 implements one or more AI engine(s) for interpolation between the first reference index specification 103 and the second reference index specification 105. In some embodiments, the specification interpolation engine 115 implements both rules-based algorithms and one or more AI engine(s) for interpolation between the first reference index specification 103 and the second reference index specification 105.

The system 100 also includes a virtual object image generation AI engine 119 that receives as input the first reference index specification 103, as indicated by arrow 148. The AI engine 119 is configured to generate and output the first image 104 of the virtual object based on the first reference index specification 103, as indicated by arrow 116 and bracket 120. The AI engine 119 also receives as input the second reference index specification 105, as indicated by arrow 150. The AI engine 119 is also configured to generate and output the second image 106 of the virtual object based on the second reference index specification 105, as indicated by arrow 116 and bracket 120. The AI engine 119 also receives as input the intermediate index specification 117-$n$, for each of n=1 to n=N, as indicated by arrow 114. The AI engine 119 is also configured to generate and output each of the intermediate image(s) 118-$n$, for n=1 to n=N, of the virtual object based on the corresponding intermediate index specification(s) 117-$n$, as indicated by arrow 116 and bracket 120.

The system 100 also includes a composition slider control 121 that enables the user to navigate from the first image 104 of the virtual object through the intermediate image(s) 118-n, for n=1 to n=N, of the virtual object to the second image 106 of the virtual object. The composition slider control 121 includes a handle 123 and a slider bar 125. The handle 123 is slidable by the user along the slider bar 125 in forward (right) and backward (left) directions, as indicated by arrow 127.

The slider bar 125 has a plurality of indexes 129-p, for p=1 to p=P, where P is a positive non-zero integer, positioned along the slider bar 125. The plurality of indexes 129-p, for p=1 to p=P, includes a first reference index (RI1) 129-2 associated with both: A) the first reference index specification 103 of the virtual object, and B) the first image 104 of the virtual object as generated by the AI engine 119. The plurality of indexes 129-p, for p=1 to p=P, also includes a second reference index (RI2) 129-(P−1) associated with both: A) the second reference index specification 105 of the virtual object, and B) the second image 106 of the virtual object as generated by the AI engine 119. The plurality of indexes 129-p, for p=1 to p=N, also includes at least one intermediate index 129-3 to 129-(P−2) respectively associated with both: A) corresponding intermediate index specification(s) 117-n, for n=1 to n=N, of the virtual object as generated by the specification interpolation engine 115, and B) corresponding intermediate image(s) 118-n, for n=1 to n=N, of the virtual object as generated by the AI engine 119.

The specification interpolation engine 115 is configured to automatically generate the respective intermediate index specification 117-n, for n=1 to n=N, for each of the at least one intermediate index(es) 129-3 to 129-(P−2) along the slider bar 125. The composition slider control 121 is configured to direct display of a given image of the virtual object corresponding to a given one of the plurality of indexes 129-p, for p=1 to p=P, along the slider bar 125 at which the handle 123 is currently positioned. The system 100 is configured to receive user-specified control inputs 107 to control generation of the composition slider control 121. The user-specified control inputs 107 are provided to the specification interpolation engine 115, as indicated by arrow 138.

FIG. 2 shows an example of a control interface 201 through which the user-specified control inputs 107 are provided to the system 100, in accordance with some embodiments. In some embodiments, the control interface 201 is provided by the system 100 through a graphical display of a computer system of the user. In some embodiments, the user-specified control inputs 107 include an identification 203 of a virtual object for which the composition slider control 121 and corresponding images are to be created by the system 100. The virtual object is essentially any noun, e.g., essentially any person, place, or thing, that is displayable through an electronic graphical display device. In some embodiments, the user-specified control inputs 107 also include a specification of the total number P of the plurality of indexes 129-1 to 129-P to be defined along the slider bar 125 of the composition slider control 121. In some embodiments, as an alternative to entering the total number P of the plurality of indexes 129-1 to 129-P, the control interface 201 provides for specification of an index density setting 205 by the user. For example, as shown in FIG. 2, possible index density settings 205 may include "very low," "low," "medium," "high," and "very high," among others, which respectively correspond to preset values of the total number P of the plurality of indexes 129-1 to 129-P. For example, in some embodiments, the index density setting 205 of "very low" corresponds to P=7, and the index density setting 205 of "low" corresponds to P=14, and the index density setting 205 of "medium" corresponds to P=21, and the index density setting 205 of "high" corresponds to P=28, and the index density setting 205 of "very high" corresponds to P=35. It should be understood that in various embodiments the control interface 201 can be configured to provide for user-selection of essentially any index density setting 205 for essentially any corresponding total number P of the plurality of indexes 129-1 to 129-P along the slider bar 125 of the composition slider control 121.

In some embodiments, the user-specified control inputs 107 include a listing of attributes 207 of the virtual object. In some embodiments, the listing of attributes 207 of the virtual object includes an attribute description d_k, for k=1 to k=Z, where Z is a positive non-zero integer indicating the total number of attributes in the listing of attributes 207. The description d_k of a given attribute k generally defines what the attribute represents, but does not specify a condition/value/characterization for the given attribute k. Also, in some embodiments, the listing of attributes 207 of the virtual object includes an attribute weighting w_k, for k=1 to k=Z. The attribute weighting w_k of a given attribute k is a multiplier that is applied by the system 100 to the attribute description d_k when directing the AI engine 119 to generate the image of the virtual object.

In some embodiments, the user-specified control inputs 107 include the first reference index specification (RI1spec) 103 for generation of the first image 104 of the virtual object by the AI engine 119. The first reference index specification (RI1spec) 103 includes a first reference index attribute specification RI1s_k for each attribute k of the total number of attributes Z in the listing of attributes 207. The first reference index attribute specification RI1s_k of a given attribute k defines the condition/value/characterization that is applied by the system 100 to the given attribute k when directing the AI engine 119 to generate the first image 104 of the virtual object corresponding to first reference index (RI1) 129-2 that is positioned along the slider bar 125 of the composition slider control 121. The first reference index specification (RI1spec) 103 that is used by the AI engine 119 to generate the first image 104 of the virtual object is a conglomeration (summation) of the first reference index attribute specifications RI1s_k, for k=1 to k=Z, as respectively weighted by (multiplied by) the attribute weightings w_k, for k=1 to k=Z, as shown in Equation 1.

$$RI1spec = \sum_{k=1}^{k=Z}(w\_k)(RI1s\_k) \qquad \text{Equation 1}$$

In some embodiments, the user-specified control inputs 107 include the second reference index specification (RI2spec) 105 for generation of the second image 106 of the virtual object by the AI engine 119. The second reference index specification (RI2spec) 105 includes a second reference index attribute specification RI2s_k for each attribute k of the total number of attributes Z in the listing of attributes 207. The second reference index attribute specification RI2s_k of a given attribute k defines the condition/value/characterization that is applied by the system 100 to the given attribute k when directing the AI engine 119 to generate the second image 106 of the virtual object corresponding to second reference index (RI2) 129-(P−1) that is positioned along the slider bar 125 of the composition slider control 121. The second reference index specification (RI2spec) 105 that is used by the AI engine 119 to generate the second image 106 of the virtual object is a conglomeration (summation) of the second reference index attribute specifications RI2s_k, for k=1 to k=Z, as respectively weighted by (multiplied by) the attribute weightings w_k, for k=1 to k=Z, as shown in Equation 2.

$$RI2spec = \sum_{k=1}^{k=Z}(w\_k)(RI2s\_k) \qquad \text{Equation 2}$$

In some embodiments, the user directly inputs the first reference specification (RI1spec) 103 through the control interface 201. Alternatively, in some embodiments, the user optionally relies upon the system 100 to automatically extract the attribute descriptions d_k, for k=1 to k=Z, and corresponding first reference index attribute specifications RI1s_k, for k=1 to k=Z, from a first reference image 109 that includes an image of the virtual object corresponding to the identification 203. In these embodiments, the automatically extracted attribute descriptions d_k, for k=1 to k=Z, are used to define the listing of attributes 207. Also, in these embodiments, the automatically extracted first reference index attribute specifications RI1s_k, for k=1 to k=Z, are used to define the first reference index specification (RI1spec) 103. The control interface 201 provides a file selection mechanism 209 that is operable by the user to select and upload the first reference image 109 to the system 100, as indicated by arrow 122 in FIG. 1. In some embodiments, the control interface 201 provides a user-activatable control 211 that when activated directs the system 100 to provide the first reference image 109 as an input to a virtual object attribute extraction AI engine 111, as indicated by arrow 124 in FIG. 1. The virtual object attribute extraction AI engine 111 is configured to perform the automatic extraction and characterization of attributes of the virtual object from the first reference image 109 to obtain the first reference specification (RI1spec) 103, which is then included within the user-specified control inputs 107, as indicated by arrow 126. The first reference specification (RI1spec) 103 as defined through the user-specified control inputs 107 is accessible by the system 100, as indicated by arrow 128, for conveyance as input to both the specification interpolation engine 115, as indicated by arrow 108, and the virtual object image generation AI engine 119, as indicated by arrow 148.

In some embodiments, the user directly inputs the second reference specification (RI2spec) 105 through the control interface 201. Alternatively, in some embodiments, the user optionally relies upon the system 100 to automatically extract the attribute descriptions d_k, for k=1 to k=Z, and corresponding second reference index attribute specifications RI2s_k, for k=1 to k=Z, from a second reference image 113 that includes an image of the virtual object corresponding to the identification 203. In these embodiments, the automatically extracted attribute descriptions d_k, for k=1 to k=Z, are used to define/augment the listing of attributes 207. Also, in these embodiments, the automatically extracted second reference index attribute specifications RI2s_k, for k=1 to k=Z, are used to define the second reference index specification (RI2spec) 105. The control interface 201 provides a file selection mechanism 213 that is operable by the user to select and upload the second reference image 113 to the system 100, as indicated by arrow 130 in FIG. 1. In some embodiments, the control interface 201 provides a user-activatable control 215 that when activated directs the system 100 to provide the second reference image 113 as an input to the virtual object attribute extraction AI engine 111, as indicated by arrow 132 in FIG. 1. The virtual object attribute extraction AI engine 111 is configured to perform the automatic extraction and characterization of attributes of the virtual object from the second reference image 113 to obtain the second reference specification (RI2spec) 105, which is then included within the user-specified control inputs 107, as indicated by arrow 134. The second reference specification (RI2spec) 105 as defined through the user-specified control inputs 107 is accessible by the system 100, as indicated by arrow 136, for conveyance as input to both the specification interpolation engine 115, as indicated by arrow 110, and the virtual object image generation AI engine 119, as indicated by arrow 150.

The virtual object attribute extraction engine 111 is configured to process a reference image to automatically identify a target virtual object within the reference image, automatically extract attributes of the target virtual object as shown in the reference image, and automatically characterize the extracted attributes of the target virtual object as shown in the reference image. In some embodiments, the virtual object attribute extraction engine 111 includes one or more AI engine(s) configured and trained to identify the target virtual object within the reference image, extract the attributes of the target virtual object as shown in the reference image, and characterize the extracted attributes of the target virtual object as shown in the reference image. As shown in FIG. 1, the system 100 includes the virtual object attribute extraction engine 111 receiving as respective inputs each of the first reference image 109 and the second reference image 113 as uploaded by the user through the control interface 201. When the virtual object attribute extraction engine 111 is directed by the user to process the first reference image 109, the first reference index specification (RI1spec) 103 is output by the virtual object attribute extraction engine 111 and is used by the system 100 to define the attribute description d_k and first reference index attribute specification RI1s_k for each attribute k, for k=1 to k=Z, within the control interface 201. Similarly, when the virtual object attribute extraction engine 111 is directed by the user to process the second reference image 113, the second reference index specification (RI2spec) 105 is output by the virtual object attribute extraction engine 111 and is used by the system 100 to define the attribute description d_k and second reference index attribute specification RI2s_k for each attribute k, for k=1 to k=Z, within the control interface 201.

It should be understood that the user may choose to upload one or both of the first reference image 109 and the second reference image 113. If the first reference image 109 is not uploaded by the user and the virtual object attribute extraction engine 111 is not used to define the first reference index specification (RI1spec) 103, then the user will directly input the first reference index specification (RI1spec) 103 through the control interface 201. Similarly, if the second reference image 113 is not uploaded and the virtual object attribute extraction engine 111 is not used to define the second reference index specification (RI2spec) 105, then the user will directly input the second reference index specification (RI2spec) 105 through the control interface 201. Also, if the virtual object attribute extraction engine 111 is used to define the second reference index specification (RI2spec) 105 after the first reference index specification (RI1spec) 103 is defined, the system 100 will automatically augment the listing of attributes 207, as needed, when automatically generating the second reference index specification (RI2spec) 105 from the second reference image 113, so as to avoid duplication or redundancy within attributes k=1 to k=Z of the listing of attributes 207. Similarly, if the virtual object attribute extraction engine 111 is used to define the first reference index specification (RI1spec) 103 after the second reference index specification (RI2spec) 105 is defined, the system 100 will automatically augment the listing of attributes 207, as needed, when automatically generating the first reference index specification (RI1spec) 103 from the first reference image 109, so as to avoid duplication or redundancy within attributes k=1 to k=Z of the listing of attributes 207.

Also, after the first reference index specification (RI1spec) 103 has been defined, either directly by the user or automatically through the virtual object attribute extraction engine 111, the first reference index specification (RI1spec) 103 is adjustable by the user through the control interface 201, with regard to any attribute description d_k, attribute weighting w_k, and/or first reference index attribute specification RI1s_k, for k=1 to k=Z. Also, after the second reference index specification (RI2spec) 105 has been defined, either directly by the user or automatically through the virtual object attribute extraction engine 111, the second reference index specification (RI2spec) 105 is adjustable by the user through the control interface 201, with regard to any attribute description d_k, attribute weighting w_k, and/or second reference index attribute specification RI2s_k, for k=1 to k=Z.

In some embodiments, the specification interpolation engine 115 automatically generates an intermediate index specification (IIspec_n) 117-n, for n=1 to n=N, by interpolating between the first reference index specification (RI1spec) 103 and the second reference index specification (RI2spec) 105, based on the position of the corresponding intermediate index (II_n) 129-p, for p=3 to p=(P−2) along the slider bar 125 of the composition slider control 121 relative to the positions of both the first reference index (RI1) 129-2 and the second reference index (RI2) 129-(P−1) along the slider bar 125 of the composition slider control 121, as shown by Equation 3.

$$\text{IIspec\_n} = \frac{[(RI1spec)((RI2) - (II\_n)) + (RI2spec)((II\_n) - (RI1))]}{(RI2) - (RI1)} \quad \text{Equation 3}$$

Also, in some embodiments, the specification interpolation engine 115 automatically generates an attribute-level intermediate index specification (IIspec_n_k), for n=1 to n=N, for a given attribute k, for k=1 to k=Z, by interpolating between the first reference index attribute specifications RI1s_k and the second reference index attribute specification RI1s_k for the given attribute k, based on the position of the corresponding intermediate index (II_n) along the slider bar 125 of the composition slider control 121 relative to the positions of both the first reference index (RI1) 129-2 and the second reference index (RI2) 129-(P−1) along the slider bar 125 of the composition slider control 121, as shown by Equation 4.

$$\text{IIspec\_n\_k} = \frac{[(RI1s\_k)((RI2) - (II\_n)) + (RI2s\_k)((II\_n) - (RI1))]}{(RI2) - (RI1)} \quad \text{Equation 4}$$

Also, the intermediate index specification (IIspec_n) 117-n corresponding to a given intermediate index (II_n) 129-p, for p=3 to p=(P−2), along the slider bar 125 of the composition slider control 121 is a combination of the attribute-level intermediate index specifications (IIspec_n_k) for all attributes k=1 to k=Z in the listing of attributes 207 of the virtual object, as respectively weighted by the attribute weightings w_k, for k=1 to k=Z, as shown in Equation 5.

$$\text{IIspec\_n} = \sum_{k=1}^{k=Z}(w\_k)(\text{IIspec\_n\_k}) \quad \text{Equation 5}$$

In some embodiments, with reference back to FIG. 1, the system 100 executes the virtual object specification interpolation engine 115 to automatically generate an anterior extrapolation index specification (AEIspec) 131, as indicated by arrow 140, for generation of an anterior extrapolation image 133 of the virtual object, based on an anterior extrapolation index percentage (AEI %) 217 entered by the user within the control interface 201. The anterior extrapolation index specification (AEIspec) 131 is provided as an input to the virtual object image generation AI engine 119, as indicated by arrow 142. The AI engine 119 is executed to generate the anterior extrapolation image 133 of the virtual object based on the anterior extrapolation index specification (AEIspec) 131. The plurality of indexes 129-p, for p=1 to p=P, along the slider bar 125 of the composition slider control 121 includes an anterior extrapolation index (AEI) 129-1 associated with both the anterior extrapolation index specification (AEIspec) 131 and the anterior extrapolation image 133 of the virtual object. The position of the anterior extrapolation index (AEI) 129-1 along the slider bar 125 of the composition slider control 121, relative to the first reference index (RI1) 129-2 and the second reference index (RI2) 129-(P−1), is given by Equation 6.

$$AEI = RI1 - \left[\left(\frac{AEI\ \%}{100}\right)(RI2 - RI1)\right] \quad \text{Equation 6}$$

In some embodiments, with reference back to FIG. 1, the system 100 executes the virtual object specification interpolation engine 115 to automatically generate a posterior extrapolation index specification (PEIspec) 135, as indicated by arrow 144, for generation of a posterior extrapolation image 137 of the virtual object, based on a posterior extrapolation index percentage (PEI %) 219 entered by the user within the control interface 201. The posterior extrapolation index specification (PEIspec) 135 is provided as an input to the virtual object image generation AI engine 119, as indicated by arrow 146. The AI engine 119 is executed to generate the posterior extrapolation image 137 of the virtual object based on the posterior extrapolation index specification (PEIspec) 135. The plurality of indexes 129-p, for p=1 to p=Z, along the slider bar 125 of the composition slider control 121 includes a posterior extrapolation index (PEI) 129-P associated with both the posterior extrapolation index specification (PEIspec) 135 and the posterior extrapolation image 137 of the virtual object. The position of the posterior extrapolation index (PEI) 129-P along the slider bar 125 of the composition slider control 121, relative to the first reference index (RI1) 129-2 and the second reference index (RI2) 129-(P−1), is given by Equation 7.

$$PEI = RI2 + \left[\left(\frac{PEI\ \%}{100}\right)(RI2 - RI1)\right] \quad \text{Equation 7}$$

In some embodiments, the specification interpolation engine 115 is configured to determine a respective attribute specification trendline (attspec_k) as a function of index (index_k) along the slider bar 125 for each attribute k, for k=1 to k=Z, in the listing of attributes 207 of the virtual object, as shown in Equation 8. The attribute specification trendline (attspec_k) for a given attribute k, for k=1 to k=Z, provides the specification for the given attribute k at a given index (index_k), along the slider bar 125 of the composition slider control 121, which is between the first reference index attribute specification RI1s_k for the given attribute k at the first reference index (RI1) 129-2 and the second reference index attribute specification RI2s_k for the given attribute k at the second reference index (RI2) 129-(P−1).

$$\text{attspec\_k} = \frac{((RI2s\_k) - (RI1s\_k))((\text{index\_k}) - (RI1))}{(RI2) - (RI1)} + RI1s\_k \quad \text{Equation 8}$$

In some embodiments, the specification interpolation engine 115 is configured to determine an anterior extrapolation index specification (AEIs_k) for a given attribute k, for k=1 to k=Z, by extrapolating along the respective attribute trendline (attspec_k) for the given attribute k in an anterior direction (direction toward the left on the slider bar 125) away from the first reference index (RI1) 129-2 over a distance 151 (see FIG. 1) equal to the anterior extrapolation index percentage (AEI %) 217 of a separation distance 153 (see FIG. 1) between the first reference index (RI1) 129-2 and the second reference index (RI2) 129-(P−1) along the slider bar 125 of the composition slider control 121, as shown in Equation 9.

$$AEIs\_k = RI1s\_k - \left[\left(\frac{AEI\ \%}{100}\right)(RI2s\_k - RI1s\_k)\right] \quad \text{Equation 9}$$

The anterior extrapolation index specification (AEIspec) 131 is a combination of the anterior extrapolation index specifications (AEIs_k) for all attributes k=1 to k=Z in the listing of attributes 207 of the virtual object, as respectively weighted by the attribute weightings w_k, for k=1 to k=Z, as shown in Equation 10.

$$AEIspec = \sum_{k=1}^{k=Z}(w\_k)(AEIs\_k) \quad \text{Equation 10}$$

Also, in some embodiments, the anterior extrapolation index specification (AEIspec) 131 is represented as a reduction or decrement of the first reference index specification (RI1spec) 103 by a portion of a differential between the second reference index specification (RI2spec) 105 and the first reference index specification (RI1spec) 103, where the portion is equal to the anterior extrapolation index percentage (AEI %) 217, as shown in Equation 11.

$$AEIspec = RI1spec - \left[\left(\frac{AEI\ \%}{100}\right)(RI2spec - RI1spec)\right] \quad \text{Equation 11}$$

In some embodiments, the specification interpolation engine 115 is configured to determine a posterior extrapolation index specification (PEIs_k) for a given attribute k, for k=1 to k=Z, by extrapolating along the respective attribute trendline (attspec_k) for the given attribute k in a posterior direction (direction toward the right on the slider bar 125) away from the second reference index (RI2) 129-(P−1) over a distance 155 (see FIG. 1) equal to the posterior extrapolation index percentage (PEI %) 219 of the separation distance 153 between the first reference index (RI1) 129-2 and the second reference index (RI2) 129-(P−1) along the slider bar 125 of the composition slider control 121, as shown in Equation 12.

$$PEIs\_k = RI2s\_k + \left[\left(\frac{PEI\ \%}{100}\right)(RI2s\_k - RI1s\_k)\right] \quad \text{Equation 12}$$

The posterior extrapolation index specification (PEIspec) 135 is a combination of the posterior extrapolation index specifications (PEIs_k) for all attributes k=1 to k=Z in the listing of attributes 207 of the virtual object, as respectively weighted by the attribute weightings w_k, for k=1 to k=Z, as shown in Equation 13.

$$PEIspec = \sum_{k=1}^{k=Z}(w\_k)(PEIs\_k) \quad \text{Equation 13}$$

Also, in some embodiments, the posterior extrapolation index specification (PEIspec) 135 is represented as a increase or increment of the second reference specification (RI2spec) 105 by a portion of the differential between the second reference specification (RI2spec) 105 and the first reference specification (RI1spec) 103, where the portion is equal to the posterior extrapolation index percentage (PEI %) 219, as shown in Equation 14.

$$PEIspec = RI2spec + \left[\left(\frac{PEI\ \%}{100}\right)(RI2spec - RI1spec)\right] \quad \text{Equation 14}$$

With reference back to FIG. 2, in some embodiments, the control interface 201 includes a create control 221 that, upon activation by the user, directs the system 100 to generate the composition slider control 121 and associate images 104, 106, 118-1 to 118-N, 133, and 137 of the virtual object. Also, in some embodiments, the control interface 201 includes a save control 223 that, upon activation by the user, directs the system 100 to save a digital record of the user-specified control inputs 107, the first reference index specification (RI1spec) 103, the second reference index specification (RI2spec) 105, the first reference image 109 (if available), the second reference image 113 (if available), the settings within the control interface 201, the composition slider control 121, and the associate images 104, 106, 118-1 to 118-N, 133, and 137 of the virtual object. Also, in some embodiments, the control interface 201 includes a reset control 225 that, upon activation by the user, directs the system 100 to clear all user-specified inputs in the control interface 201.

FIG. 3 shows an example of an attribute-level slider control interface 301 provided by the system 100, in accordance with some embodiments. In some embodiments, the attribute-level slider control interface 301 is provided by the system 100 through a graphical display of a computer system of the user. Through the attribute-level slider control interface 301, the user is able to adjust one or more of the listing of attributes 207, first reference index specification (RI1spec) 103, and the second reference index specification (RI2spec) 105. The listing of attributes 207 in the attribute-level slider control interface 301 includes the attribute description d_k and the attribute weighting w_k for each of the attributes k=1 to k=Z.

The attribute-level slider control interface 301 includes a set of attribute-level slider controls 303, which includes a respective attribute slider control 303-k for each attribute k, for k=1 to k=Z, in the listing of attributes 207 of the virtual object. Each attribute slider control 303-k for a given attribute k, for k=1 to k=Z, of the virtual object includes a corresponding slider track 305-k, a corresponding first handle 307-k, and a corresponding second handle 311-k. For a given attribute k, the first handle 307-k is slideable in each direction (left and right) along the slider track 305-k, as indicated by arrow 309-k, for adjustment of the first reference index attribute specification RI1s_k of the given attribute k, which also corresponds to adjustment of a position of a first reference attribute-level index RI1ai_k along the slider track 305-k for the given attribute k. Also, for a given attribute k, the second handle 311-k is slideable in each direction (left and right) along the slider track 305-k, as indicated by arrow 313-k, for adjustment of the second reference index attribute specification RI2s_k of the given attribute k, which also corresponds to adjustment of a position of a second reference attribute-level index RI2ai_k along the slider track 305-k for the given attribute k.

In some embodiments, the specification interpolation engine 115 is configured to automatically interpolate an adjusted first reference index attribute specification RI1s'_k of a particular attribute k of the virtual object based on an adjusted position RI1ai'_k of the first handle 307-k along the slider track 305-k of the attribute slider control 303-k for the particular attribute k, as shown in Equation 15, where RI1 is the starting position of the first handle 307-k along the slider track 305-k when the attribute-level slider control interface 301 is launched before the first handle 307-k is moved along the slider track 305-k, and where RI2 is the starting position of the second handle 311-k along the slider track 305-k when the attribute-level slider control interface 301 is launched before the second handle 311-k is moved along the slider track 305-k, and where RI1s_k is the first reference index attribute specification when the attribute-level slider control interface 301 is launched before the first handle 307-k is moved along the slider track 305-k, and where RI2s_k is the second reference index attribute specification when the attribute-level slider control interface 301 is launched before the second handle 311-k is moved along the slider track 305-k.

$$RI1s'\_k = \frac{((RI2s\_k) - (RI1s\_k))((RI1ai'\_k) - (RI1))}{(RI2) - (RI1)} + RI1s\_k \quad \text{Equation 15}$$

Also, in some embodiments, the specification interpolation engine 115 is configured to automatically interpolate an adjusted second specification RI2s'_k of a particular attribute k of the virtual object based on an adjusted position RI2ai'_k of the second handle 311-k along the slider track 305-k of the attribute slider control 303-k for the particular attribute k, as shown in Equation 16, where RI1 is the starting position of the first handle 307-k along the slider track 305-k when the attribute-level slider control interface 301 is launched before the first handle 307-k is moved along the slider track 305-k, and where RI2 is the starting position of the second handle 311-k along the slider track 305-k when the attribute-level slider control interface 301 is launched before the second handle 311-k is moved along the slider track 305-k, and where RI1s_k is the first reference index attribute specification when the attribute-level slider control interface 301 is launched before the first handle 307-k is moved along the slider track 305-k, and where RI2s_k is the second reference index attribute specification when the attribute-level slider control interface 301 is launched before the second handle 311-k is moved along the slider track 305-k.

$$RI2s'\_k = \frac{((RI2s\_k) - (RI1s\_k))((RI2ai'\_k) - (RI1))}{(RI2) - (RI1)} + RI1s\_k \quad \text{Equation 16}$$

The attribute-level slider control interface 301 includes an apply control 315 that, upon activation by the user, directs the specification interpolation engine 115 to automatically generate an adjusted first reference index specification (RI1spec') 103 for regeneration of the first image 104 of the virtual object based on the combination of the adjusted first reference index attribute specifications RI1s'_k for k=1 to k=Z as set through the attribute-level slider control interface 301, and as respectively weighted by the attribute weightings w_k, for k=1 to k=Z, as shown in Equation 17. Also, in some embodiments, the attribute-level slider control interface 301 includes a reset control 319 that, upon activation by the user, directs the system 100 to revert all inputs shown in the attribute-level slider control interface 301 to their respective settings that existed when the attribute-level slider control interface 301 was launched.

$$RI1spec' = \sum_{k=1}^{k=Z} (w\_k)(RI1s'\_k) \quad \text{Equation 17}$$

Also, when the apply control 315 is activated by the user, the specification interpolation engine 115 is directed to automatically generate an adjusted second reference index specification (RI2spec') 105 for regeneration of the second image 106 of the virtual object based on the combination of the adjusted second reference index attribute specifications RI2s'_k for k=1 to k=Z as set through the attribute-level slider control interface 301, and as respectively weighted by the attribute weightings w_k, for k=1 to k=Z, as shown in Equation 18.

$$RI2spec' = \sum_{k=1}^{k=Z} (w\_k)(RI2s'\_k) \quad \text{Equation 18}$$

After the adjusted first reference index specification (RI1spec') 103 and the adjusted second reference index specification (RI2spec') 105 are generated, activation of the apply control 315 by the user directs the specification interpolation engine 115 to automatically generate a respective adjusted intermediate index specification (IIspec'_n) 117-n for generation of the corresponding intermediate image 118-n of the virtual object by interpolating between the adjusted first reference index specification (RI1spec') 103 and the adjusted second reference index specification (RI2spec') 105, for each of the corresponding intermediate indexes (II_n) for n=1 to n=N, in same manner as shown in Equations 3, 4, and 5.

The AI engine 119 automatically receives as input the adjusted first reference index specification (RI1spec') 103. The AI engine 119 automatically regenerates and outputs an adjusted first image 104 of the virtual object based on the adjusted first reference index specification (RI1spec') 103. Also, the AI engine 119 automatically receives as input the adjusted second reference index specification (RI2spec') 105. The AI engine 119 automatically regenerates and outputs an adjusted second image 106 of the virtual object based on the adjusted second reference index specification (RI2spec') 105. Also, the AI engine 119 automatically receives as input the adjusted intermediate index specification (IIspec'_n) 117-$n$, for each of n=1 to n=N. The AI engine 119 automatically regenerates and outputs adjusted intermediate image(s) 118-$n$, for each of n=1 to n=N, of the virtual object based on the corresponding adjusted intermediate index specification (IIspec'_n) 117-$n$.

With reference back to FIG. 1, in some embodiments, when the handle 123 of the composition slider control 121 is positioned between two neighboring indexes of the plurality of indexes 129-1 to 129-P positioned along the slider bar 125, the AI engine 119 is configured to generate an interpolated image of the virtual object from two neighboring AI engine-generated images of the virtual object. The two neighboring AI engine-generated images of the virtual object respectively correspond to the two neighboring indexes of the plurality of indexes 129-1 to 129-P.

FIG. 4 shows a usage example of the control interface 201 of FIG. 2, in accordance with some embodiments. The identification 203 of the virtual object for which the composition slider control 121 and associated specifications and images are to be generated is specified as a "boat." The anterior extrapolation index percentage (AEI %) 217 is specified as 10%. The posterior extrapolation index percentage (PEI %) 219 is specified as 20%. The index density 205 is specified as "very low," which in this example corresponds to a preset value of seven for the total number P of the plurality of indexes 129-1 to 129-P positioned along the slider bar 125 of the composition slider control 121. In this example, the total number P=7 of the plurality of indexes 129-1 to 129-7 includes the anterior extrapolation index (AEI) 129-1, the first reference index (RI1) 129-2, three intermediate indexes (II_1) 129-3, (II_2) 129-4, and (II_3) 129-5, the second reference index (RI2) 129-6, and the posterior extrapolation index (PEI) 129-7. In this example, the total number N of intermediate indexes is three. Therefore, in this example, there are three intermediate index specifications (IIspec_1) 117-1 for n=1, (IIspec_2) 117-2 for n=2, and (IIspec_3) 117-3 for n=3=N. Correspondingly, in this example, there are three intermediate images 118-1 for n=1, 118-2 for n=2, and 118-3 for n=3=N, respectively generated by the system 100 based on the three intermediate index specifications (IIspec_1) 117-1 for n=1, (IIspec_2) 117-2 for n=3, and (IIspec_3) 117-3 for n=3=N.

In some embodiments, in the example of FIG. 4, the user manually specifies the listing of attributes 207 by entering the attribute descriptions d_k and the attribute weightings w_k, for each attribute k for k=1 to k=Z, where Z=5. In this example, the attribute descriptions d_1 through d_5 are respectively entered as "style," "hull," "power," "age," and "size." Also, in this example, the attribute weightings w_1 through w_5 are respectively entered as 20%, 20%, 20%, 20%, and 20%. Also, in some embodiments, the user manually specifies the first reference index specification (RI1spec) 103 by entering the first reference index attribute specifications RI1$s$_k, for each attribute k for k=1 to k=Z, where Z=5. In this example, the first reference index attribute specifications RI1$s$_1 through RI1$s$_5 are respectively entered as "galleon," "wood," "sail," "ancient," and "huge." Also, in some embodiments, the user manually specifies the second reference index specification (RI2spec) 105 by entering the second reference index attribute specifications RI2$s$_k, for each attribute k for k=1 to k=Z, where Z=5. In this example, the second reference index attribute specifications RI2$s$_1 through RI2$s$_5 are respectively entered as "race," "fiberglass," "outboard," "modern," and "sleek."

In some embodiments, rather than the user manually entering the listing of attributes 207 and the first reference specification (RI1spec) 103, the user directs the system 100 to automatically extract the listing of attributes 207 and the first reference specification (RI1spec) 103 from the first reference image 109. In these embodiments, the user utilizes the file selection mechanism 209 to select and upload the first reference image 109 to the system 100. The user then activates the user-selectable control 211, which directs the system 100 to provide the first reference image 109 as an input to the virtual object attribute extraction engine 111, which performs the automatic extraction and characterization of attributes of the virtual object corresponding to the identification 203 from the first reference image 109 to obtain the first reference specification (RI1spec) 103 which is presented in the control interface 201.

Also, in some embodiments, rather than the user manually entering the listing of attributes 207 and the second reference specification (RI2spec) 105, the user directs the system 100 to automatically extract the listing of attributes 207 and the second reference specification (RI2spec) 105 from the second reference image 113. In these embodiments, the user utilizes the file selection mechanism 213 to select and upload the second reference image 113 to the system 100. The user then activates the user-selectable control 215, which directs the system 100 to provide the second reference image 113 as an input to the virtual object attribute extraction engine 111, which performs the automatic extraction and characterization of attributes of the virtual object corresponding to the identification 203 from the second reference image 113 to obtain the second reference specification (RI2spec) 105 which is presented in the control interface 201. The listing of attributes 207 is automatically augmented/adjusted as part of the automatic extraction and characterization of attributes of the virtual object from the second reference image 113 by the virtual object attribute extraction engine 111.

FIG. 5 shows the attribute-level slider control interface 301 of FIG. 3 based on the user-specified inputs entered through the control interface 201 in the example of FIG. 4, in accordance with some embodiments. For each attribute k, for k=1 to k=Z, the user is able to move any of the handles 307-$k$ either left or right along the corresponding slider bar 305-$k$, as indicated by arrow 309-$k$, in order to adjust the first reference index attribute specification RI1$s$_k and associated first reference attribute index RI1$ai$_k position along the slider bar 305-$k$, where Z is 5 in the example. Also, for each attribute k, for k=1 to k=Z, the user is able to move any of the handles 311-$k$ either left or right along the corresponding slider bar 305-$k$, as indicated by arrow 313-$k$, in order to adjust the second reference index attribute specification RI2$s$_k and associated second reference attribute index RI2$ai$_k position along the slider bar 305-$k$, where Z is 5 in the example.

Figure 6A:
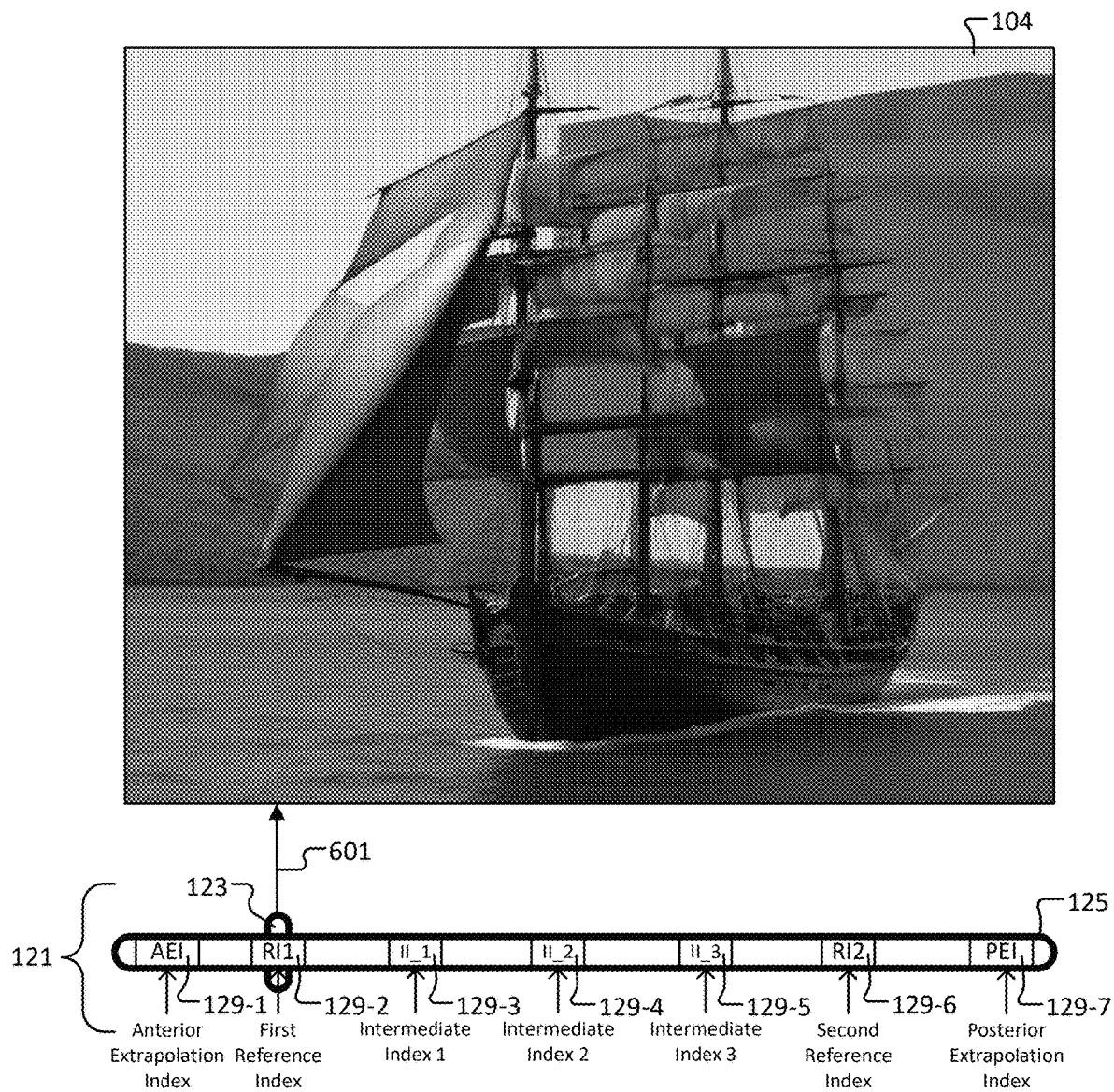
FIG. 6A shows the composition slider control with the handle positioned at the first reference index (RI1) along the slider bar, in accordance with some embodiments.

FIGS. 6A through 6H show various positions of the handle 123 along the slider bar 125 of the composition slider control 121, and corresponding images of the virtual object as automatically generated by the system 100 based on the user-specified inputs entered through the control interface 201 in the example of FIG. 4, in accordance with some embodiments. FIG. 6A shows the composition slider control 121 with the handle 123 positioned at the first reference index (RI1) 129-2 along the slider bar 125, in accordance with some embodiments. The positioning of the handle 123 at the first reference index (RI1) 129-2 directs display of the image 104 of the virtual object as generated by the AI engine 119 based on the first reference index specification (RI1spec) 103, as indicated by arrow 601.

Figure 6B:
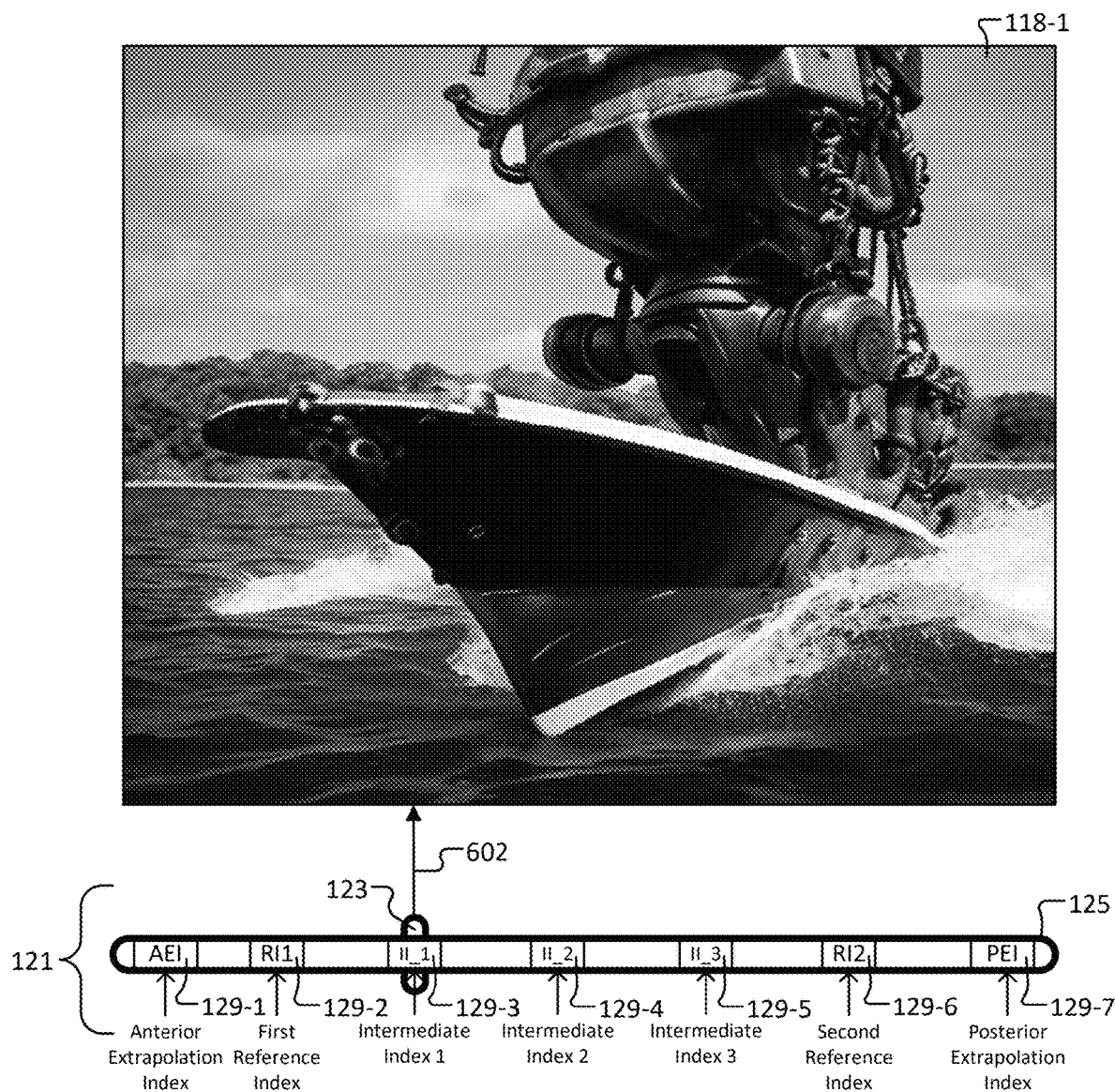
FIG. 6B shows the composition slider control with the handle positioned at the first intermediate index (II_1) along the slider bar, in accordance with some embodiments.

FIG. 6B shows the composition slider control 121 with the handle 123 positioned at the first intermediate index (II_1) 129-3 along the slider bar 125, in accordance with some embodiments. The positioning of the handle 123 at the first intermediate index (II_1) 129-3 directs display of the image 118-1 of the virtual object as generated by the AI engine 119 based on the first intermediate index specification (IIspec_1) 117-1, for n=1, as indicated by arrow 602.

Figure 6C:
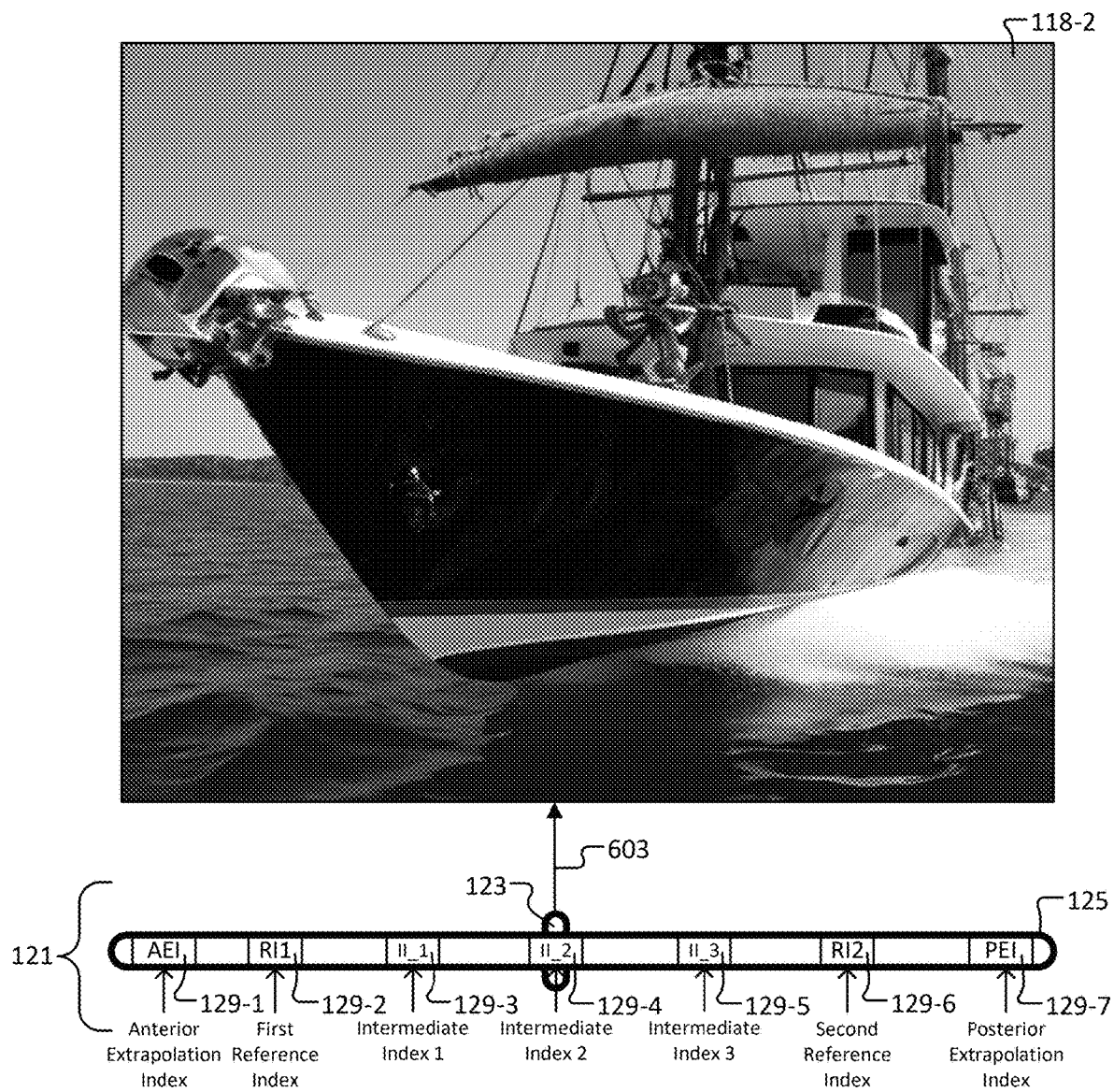
FIG. 6C shows the composition slider control with the handle positioned at the second intermediate index (II_2) along the slider bar, in accordance with some embodiments.

FIG. 6C shows the composition slider control 121 with the handle 123 positioned at the second intermediate index (II_2) 129-4 along the slider bar 125, in accordance with some embodiments. The positioning of the handle 123 at the second intermediate index (II_2) 129-4 directs display of the image 118-2 of the virtual object as generated by the AI engine 119 based on the second intermediate index specification (IIspec_2) 117-2, for n=2, as indicated by arrow 603.

Figure 6D:
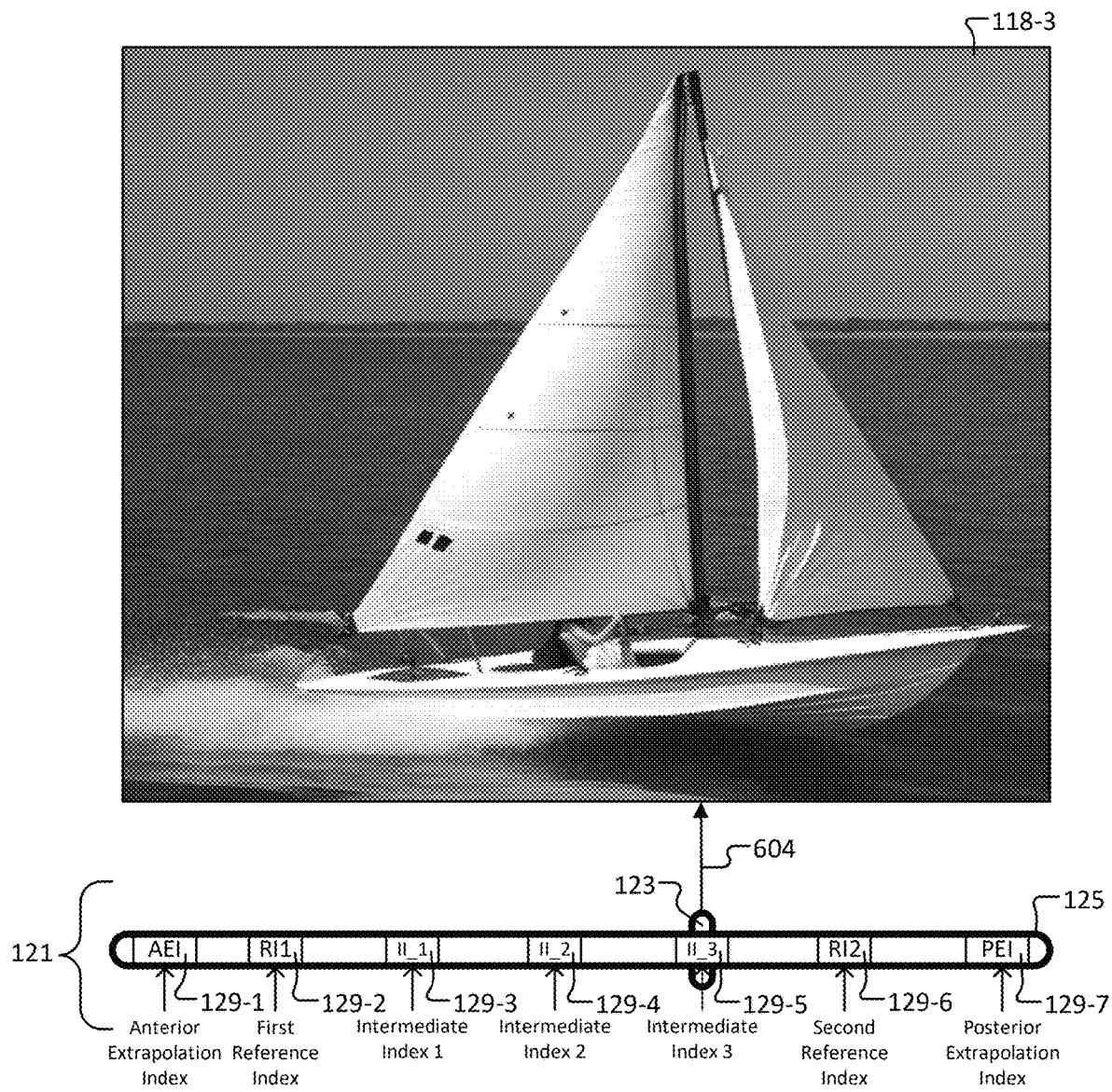
FIG. 6D shows the composition slider control with the handle positioned at the third intermediate index (II_3) along the slider bar, in accordance with some embodiments.

FIG. 6D shows the composition slider control 121 with the handle 123 positioned at the third intermediate index (II_3) 129-5 along the slider bar 125, in accordance with some embodiments. The positioning of the handle 123 at the third intermediate index (II_3) 129-5 directs display of the image 118-3 of the virtual object as generated by the AI engine 119 based on the third intermediate index specification (IIspec_3) 117-3, for n=3, as indicated by arrow 604.

Figure 6E:
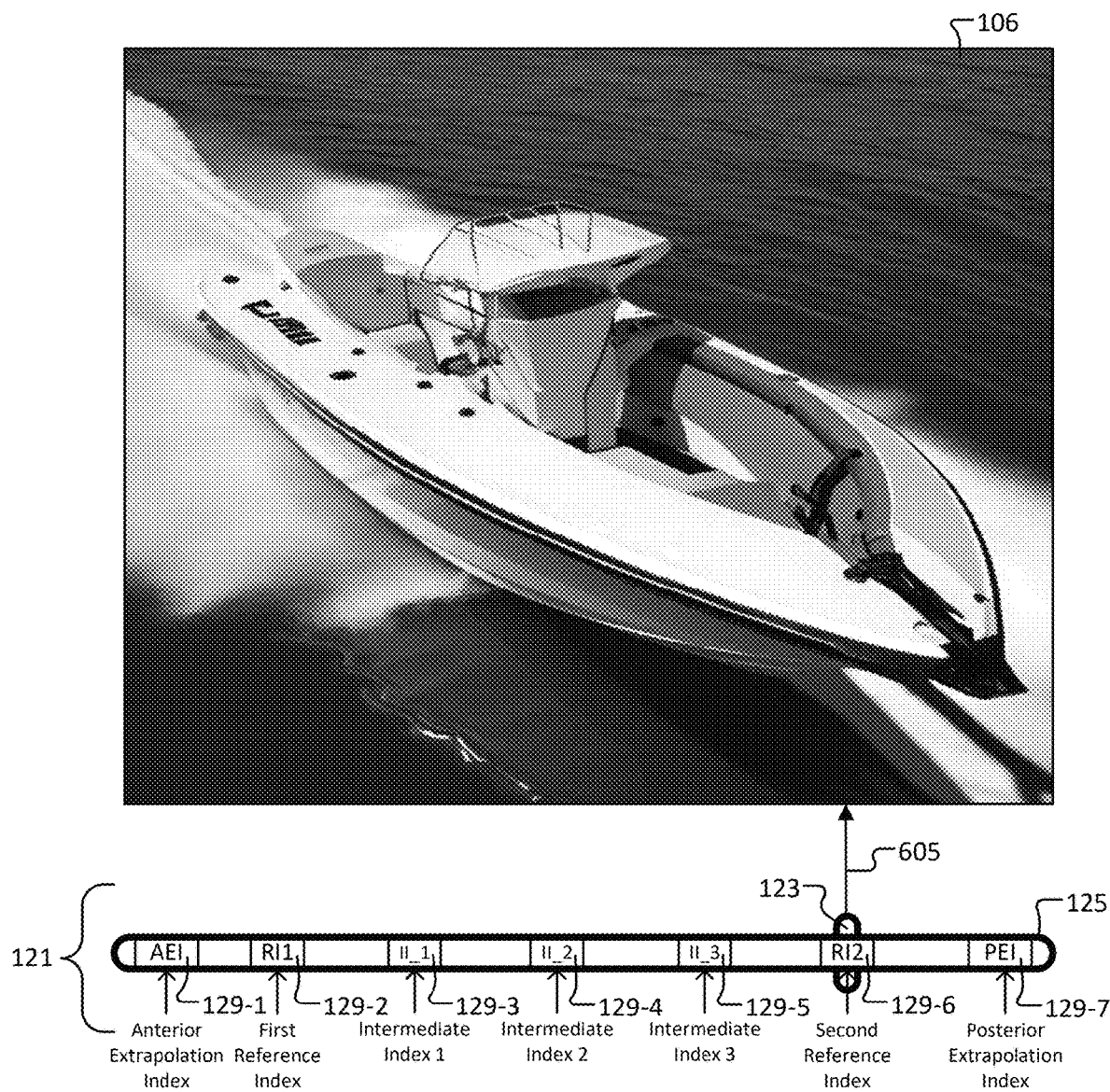
FIG. 6E shows the composition slider control with the handle positioned at the second reference index (RI2) along the slider bar, in accordance with some embodiments.

FIG. 6E shows the composition slider control 121 with the handle 123 positioned at the second reference index (RI2) 129-6 along the slider bar 125, in accordance with some embodiments. The positioning of the handle 123 at the second reference index (RI2) 129-6 directs display of the image 106 of the virtual object as generated by the AI engine 119 based on the second reference index specification (RI2spec) 105, as indicated by arrow 605.

Figure 6F:
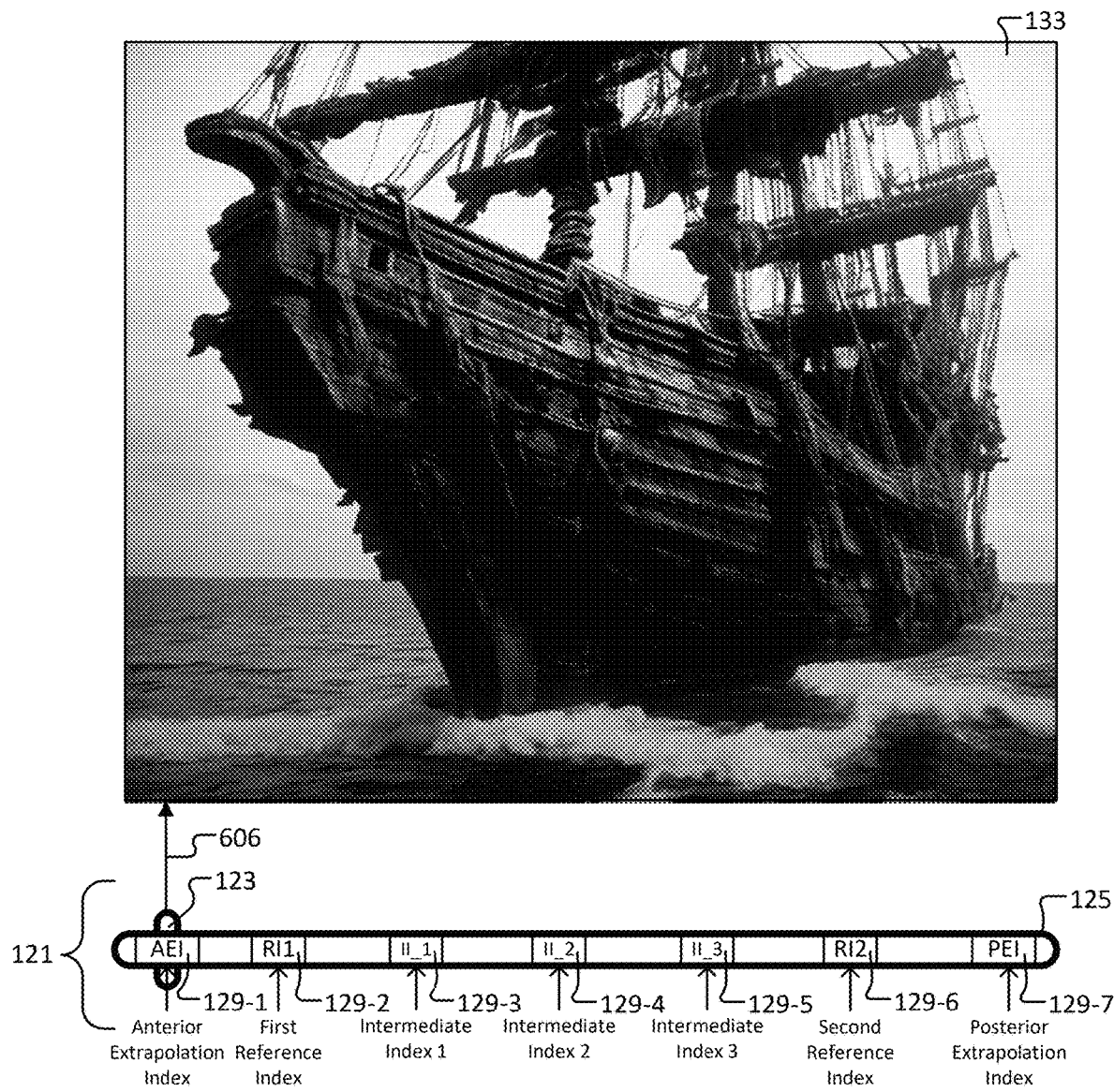
FIG. 6F shows the composition slider control with the handle positioned at the anterior extrapolation index (AEI) along the slider bar, in accordance with some embodiments.

FIG. 6F shows the composition slider control 121 with the handle 123 positioned at the anterior extrapolation index (AEI) 129-1 along the slider bar 125, in accordance with some embodiments. The positioning of the handle 123 at the anterior extrapolation index (AEI) 129-1 directs display of the image 133 of the thing 203 that is the virtual object as generated by the AI engine 119 based on the anterior extrapolation index specification (AEIspec) 131, as indicated by arrow 606.

Figure 6G:
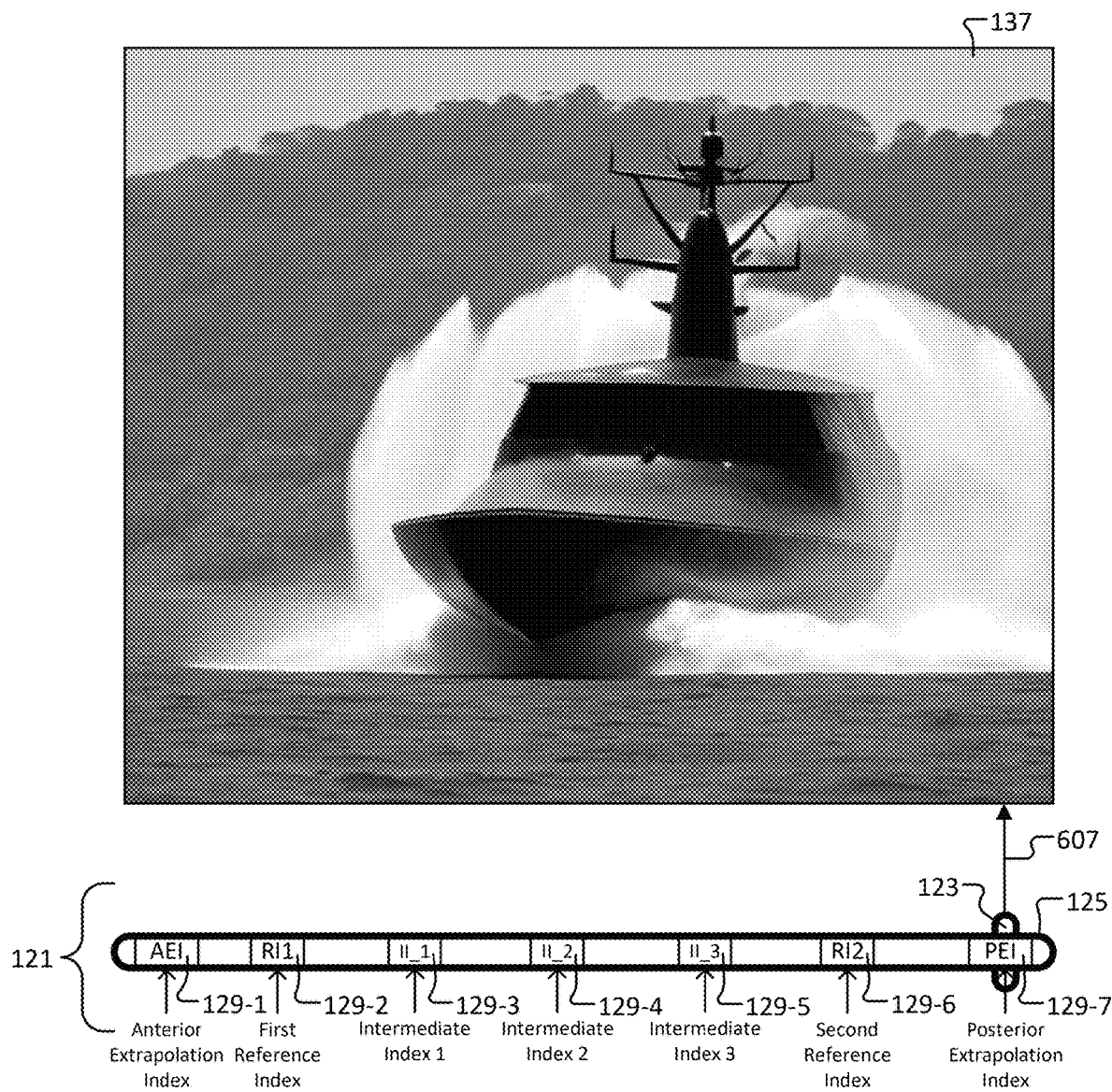
FIG. 6G shows the composition slider control with the handle positioned at the posterior extrapolation index (PEI) along the slider bar, in accordance with some embodiments.

FIG. 6G shows the composition slider control 121 with the handle 123 positioned at the posterior extrapolation index (PEI) 129-7 along the slider bar 125, in accordance with some embodiments. The positioning of the handle 123 at the posterior extrapolation index (PEI) 129-7 directs display of the image 137 of the virtual object as generated by the AI engine 119 based on the posterior extrapolation index specification (PEIspec) 135, as indicated by arrow 607.

Figure 6H:
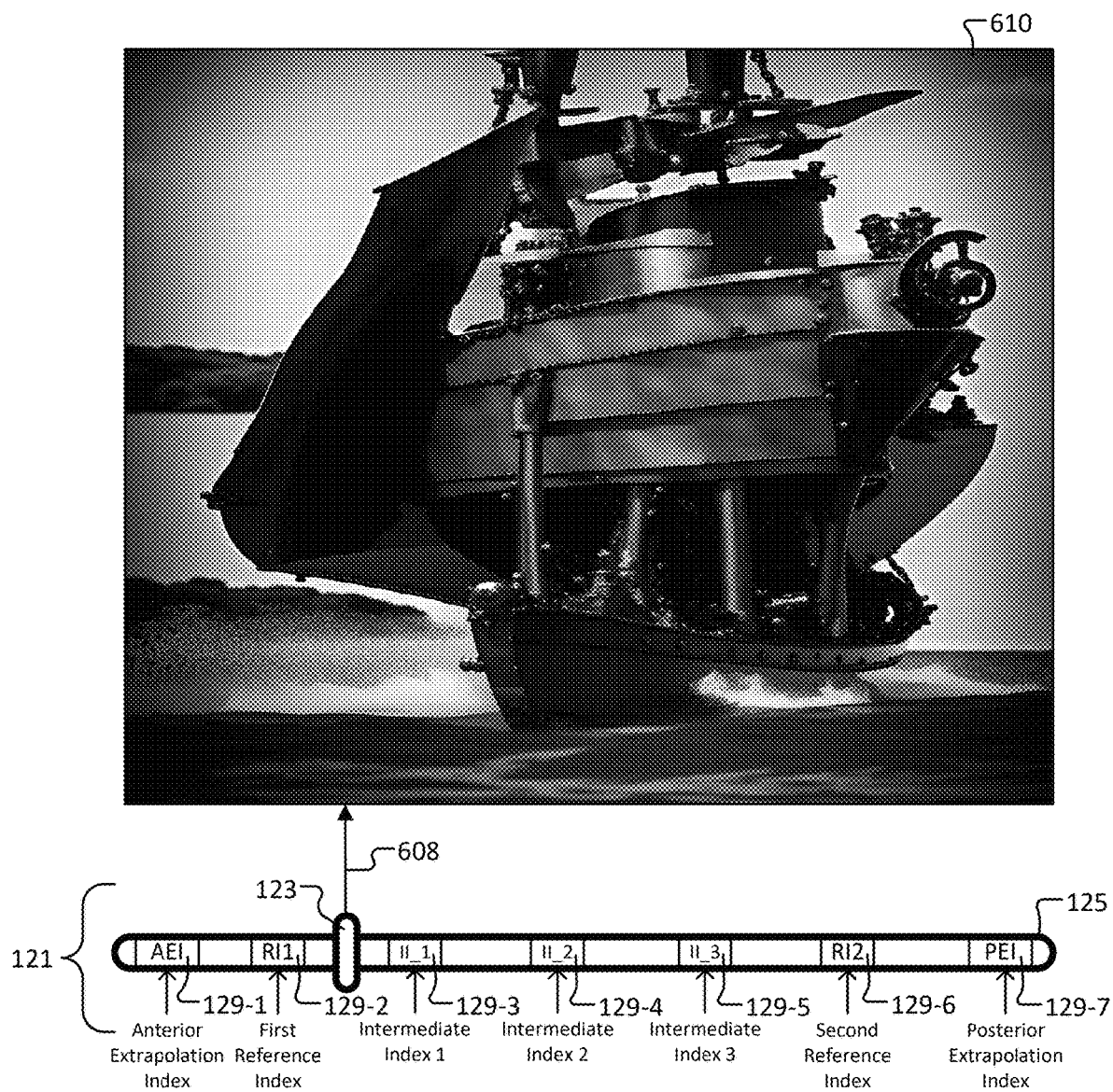
FIG. 6H shows the composition slider control with the handle positioned along the slider bar between the first reference index (RI1) and the first intermediate index (II_1), in accordance with some embodiments.

FIG. 6H shows the composition slider control 121 with the handle 123 positioned along the slider bar 125 between the first reference index (RI1) 129-2 and the first intermediate index (II_1) 129-3, in accordance with some embodiments. In the example of FIG. 4, the positioning of the handle 123 between any two neighboring indexes of the plurality of indexes 129-1 through 129-7 along the slider bar 125 of the composition slider control 121 directs that AI engine 119 to generate an interpolated image 610 of the virtual object from said two neighboring AI engine 119-generated images of the virtual object, as indicated by arrow 608. The two neighboring AI engine 119-generated images of the virtual object respectively correspond to the two neighboring indexes 129-1 and 129-2 between which the handle 123 is positioned. In the example of FIG. 6H, the two neighboring indexes 129-1 and 129-2 are the first reference index (RI1) 129-2 and the first intermediate index (II_1) 129-3, respectively. Also, in the example of FIG. 6H, the two neighboring AI engine 119-generated images of the virtual object are the image 104 of the virtual object and the image 118-1 of the virtual object. Therefore, the image 610 of the virtual object is an interpolation between the image 104 of the virtual object and the image 118-1 of the virtual object.

Figure 7:
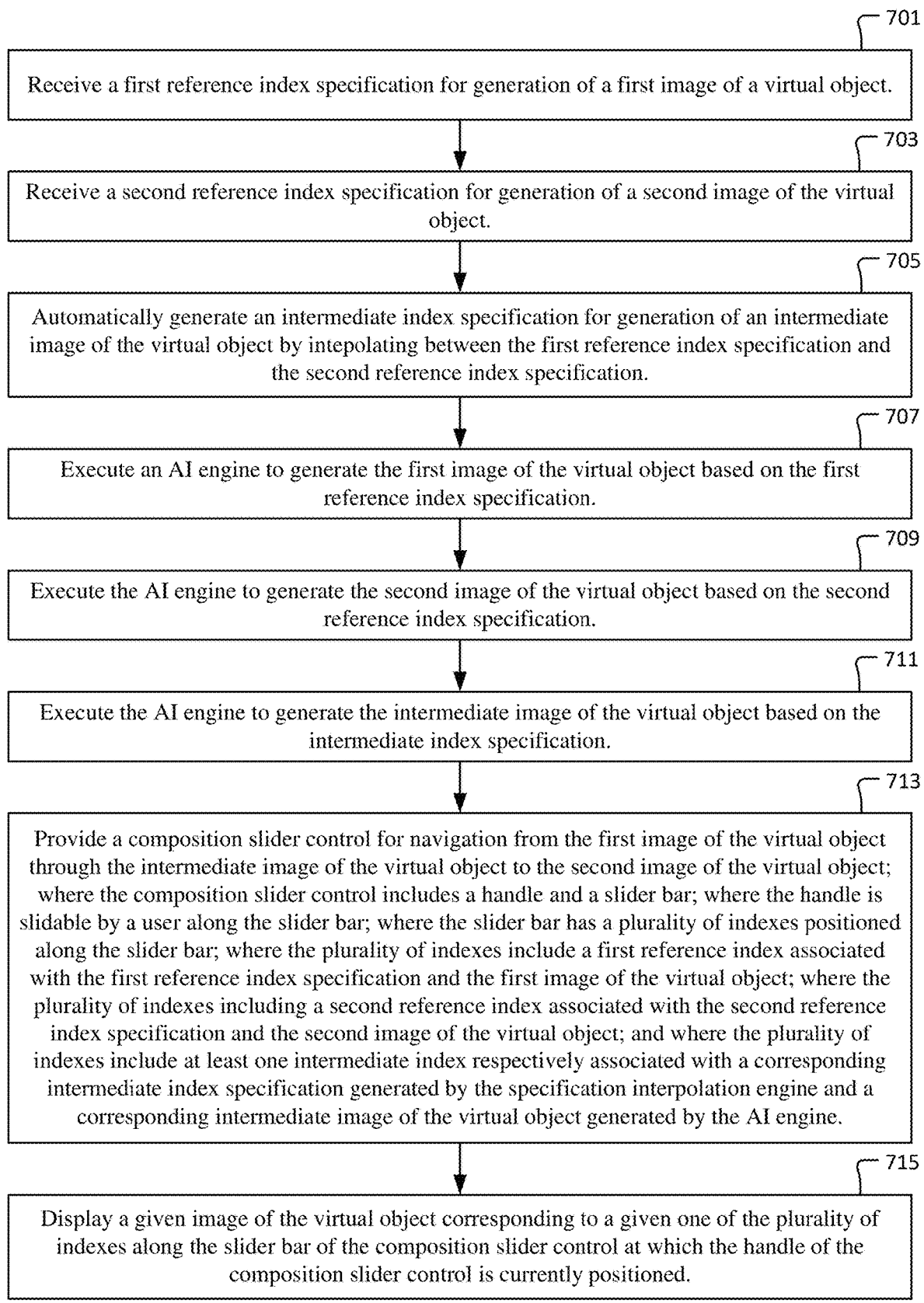
FIG. 7 shows a flowchart of a method for AI-based generation of an image of a virtual object, in accordance with some embodiments.

FIG. 7 shows a flowchart of a method for AI-based generation of an image of a virtual object, in accordance with some embodiments. The method includes an operation 701 for receiving the first reference index specification (RI1spec) 103 for generation of the first image 104 of the virtual object. The method also includes an operation 703 for receiving the second reference index specification (RI2spec) 105 for generation of the second image 106 of the virtual object. In some embodiments, each of the first reference index specification (RI1spec) 103 and the second reference index specification (RI2spec) 105 includes the listing of attributes 207 of the virtual object. The first reference index specification (RI1spec) 103 includes the first reference index attribute specification (RI1s_k) for each attribute k, for k=1 to k=Z, in the listing of attributes 207 of the virtual object. The second reference index specification (RI2spec) 105 includes the second reference index attribute specification (RI2s_k) for each attribute k, for k=1 to k=Z, in the listing of attributes 207 of the virtual object.

In some embodiments, the method includes receiving the identification 203 of the virtual object. In some embodiments, the method includes receiving the value of the total number P of the plurality of indexes 129-1 to 129-P to be generated along the slider bar 125 of the composition slider control 121. In some embodiments, the method includes receiving an input of the listing of attributes 207 of the virtual object.

The method also includes an operation 705 for automatically generating the intermediate index specification (IIspec_n) 117-n for generation of the intermediate image 118-n of the virtual object, for n=1 to n=N, by interpolating between the first reference index specification (RI1spec) 103 and the second reference index specification (RI2spec) 105. In some embodiments, the method includes automatically generating a respective intermediate index specification (IIspec_n) 117-n, for n=1 to n=N, which respectively correspond to the intermediate indexes 129-3 to 129-(P−2) of the plurality of indexes 129-1 to 129-P.

The method also includes an operation 707 for executing the AI engine 119 to generate the first image 104 of the virtual object based on the first reference index specification (RI1spec) 103. The method also includes an operation 709 for executing the AI engine 119 to generate the second image 106 of the virtual object based on the second reference index specification (RI2spec) 105. The method also includes an operation 711 for executing the AI engine 119 to generate the intermediate image 118-n, for n=1 to n=N, of the virtual object based on the intermediate index specification (IIspec_n) 117-n, for n=1 to n=N.

The method also includes an operation 713 for generating the composition slider control 121 for navigation from the first image 104 of the virtual object through each intermediate image 118-$n$ of the virtual object, for n=1 to n=N, to the second image 106 of the virtual object. The composition slider control 121 includes the handle 123 and the slider bar 125. The handle 123 is slidable by the user along the slider bar 125. The slider bar 125 has the plurality of indexes 129-1 to 129-P positioned along the slider bar 125. The plurality of indexes 129-1 to 129-P include the first reference index (RI1) 129-2 associated with both the first reference index specification (RI1spec) 103 and the first image 104 of the virtual object. The plurality of indexes 129-1 to 129-P also include the second reference index (RI2) 129-(P−1) associated with both the second reference index specification (RI2spec) 105 and the second image 106 of the virtual object. The plurality of indexes 129-1 to 129-P also include at least one intermediate index (II_n) 129-3 to 129-(P−2) respectively associated with both a corresponding intermediate index specification (IIspec_n) 117-$n$, for n=1 to n=N, generated by the specification interpolation engine 115 and the corresponding intermediate image 118-1 to 118-N, for n=1 to n=N, of the virtual object generated by the AI engine 119.

The method also includes an operation 715 for displaying a given image of the virtual object corresponding to a given one of the plurality of indexes 129-1 to 129-P along the slider bar 125 of the composition slider control 121 at which the handle 123 of the composition slider control 121 is currently positioned. In some embodiments, the method includes executing the AI engine 119 to generate an interpolated image of the virtual object from two neighboring AI engine 119-generated images of the virtual object when the handle 123 of the composition slider control 121 is positioned between two neighboring indexes of the plurality of indexes 129-1 to 129-P positioned along the slider bar 125 of the composition slider control 121, where the two neighboring AI engine 119-generated images of the virtual object respectively correspond to the two neighboring indexes.

In some embodiments, the method includes providing a set of attribute-level slider controls 303 that include a respective attribute slider control 303-$k$, for each attribute k, for k=1 to k=Z, in the listing of attributes 207 of the virtual object, where Z is the total number of attributes. Each attribute slider control 303-$k$ for a given attribute k of the virtual object includes a first handle 307-$k$, a second handle 311-$k$, and a slider track 305-$k$. The first handle 307-$k$ is slideable along the slider track 305-$k$ for adjustment of the first reference index attribute specification (RI1$s$_k) of the given attribute k. The second handle 311-$k$ is slideable along the slider track 305-$k$ for adjustment of the second reference index attribute specification (RI2$s$_k) of the given attribute k.

The method also includes detecting an adjusted position of the first handle 307-$k$ along the slider track 305-$k$ of the attribute slider control 303-$k$ for a particular attribute k. The method also includes automatically interpolating an adjustment of the first reference index attribute specification (RI1$s$_k) of the particular attribute k of the virtual object based on the adjusted position of the first handle 307-$k$ along the slider track 305-$k$ of the attribute slider control 303-$k$ for the particular attribute k. The method also includes detecting an adjusted position of the second handle 311-$k$ along the slider track 305-$k$ of the attribute slider control 303-$k$ for the particular attribute k. The method also includes automatically interpolating an adjustment of the second reference index attribute specification (RI2$s$_k) of the particular attribute k of the virtual object based on the adjusted position of the second handle 311-$k$ along the slider track 305-$k$ of the attribute slider control 303-$k$ for the particular attribute k.

In some embodiments, the method includes automatically generating an adjusted first reference index specification (RI1spec') 103 for regeneration of the first image 104 of the virtual object based on the adjusted first specifications (RI1$s$'_k) of the attributes k=1 to k=Z of the virtual object as specified through the set of attribute-level slider controls 303. The method also includes automatically generating an adjusted second reference index specification (RI2spec') 105 for generation of the second image 106 of the virtual object based on the adjusted second specifications (RI2$s$'_k) of the attributes k=1 to k=Z of the virtual object as specified through the set of attribute-level slider controls 303. Also, for each of the at least one intermediate index (II_n), for n=1 to n=N, positioned along the slider bar 125 of the composition slider control 121, the method also includes automatically generating a respective adjusted intermediate index specification (IIspec'_n) 117-$n$, for n=1 to n=N, for generation of the corresponding intermediate image 118-$n$, for n=1 to n=N, of the virtual object by interpolating between the adjusted first reference index specification (RI1spec') 103 and the adjusted second reference index specification (RI2spec') 105.

The method also includes executing the AI engine 119 to regenerate the first image 104 of the virtual object based on the adjusted first reference index specification (RI1spec') 103. The method also includes executing the AI engine 119 to regenerate the second image 106 of the virtual object based on the adjusted second reference index specification (RI2spec'). Also, for each of the at least one intermediate index (II_n), for n=1 to n=N, the method includes executing the AI engine 119 to regenerate the corresponding intermediate image 118-$n$, for n=1 to n=N, of the virtual object based on the respective adjusted intermediate index specification (IIspec'_n) 117-$n$, for n=1 to n=N.

In some embodiments, the method includes receiving a value indicating the anterior extrapolation index percentage (AEI %) 217. The method also includes automatically generating the anterior extrapolation index specification (AEIspec) 131 for generation of the anterior extrapolation image 133 of the virtual object based on the anterior extrapolation index percentage (AEI %) 217. The method also includes executing the AI engine 119 to generate the anterior extrapolation image 133 of the virtual object based on the anterior extrapolation index specification (AEIspec) 131. The plurality of indexes 129-1 to 129-P positioned along the slider bar 125 of the composition slider control 121 include the anterior extrapolation index (AEI) 129-1 associated with both the anterior extrapolation index specification (AEIspec) 131 and the anterior extrapolation image 133 of the virtual object.

Also, in some embodiments, the method includes receiving a value indicating the posterior extrapolation index percentage (PEI %) 219. The method also includes automatically generating the posterior extrapolation index specification (PEIspec) 135 for generation of the posterior extrapolation image 137 of the virtual object based on the posterior extrapolation index percentage (PEI %) 219. The method also includes executing the AI engine 119 to generate the posterior extrapolation image 137 of the virtual object based on the posterior extrapolation index specification (PEIspec) 135. The plurality of indexes 129-1 to 129-P positioned along the slider bar 125 of the composition slider control 121 include the posterior extrapolation index (PEI) 129-P associated with both the posterior extrapolation index specification (PEIspec) 135 and the posterior extrapolation image 137 of the virtual object.

In some embodiments, for each attribute k=1 to k=Z in the listing of attributes 207 of the virtual object, the method includes determining the respective attribute trendline (attspec_k), as shown in Equation 8, for said attribute k between the first reference index attribute specification (RI1s_k) for said attribute k and the second reference index attribute specification (RI2s_k) for said attribute k. Also, for each attribute k=1 to k=Z in the listing of attributes 207 of the virtual object, the method includes determining the anterior extrapolation index specification (AEIspec_k) 131 for said attribute k by extrapolating along the respective attribute trendline (attspec_k) for said attribute k in the anterior direction away from the first reference index (RI1) 129-2 over the distance 151, which is equal to the anterior extrapolation index percentage (AEI %) 217 of the separation distance 153 between the first reference index (RI1) 129-2 and the second reference index (RI2) 129-(P−1) along the slider bar 125 of the composition slider control 121. The method also includes determining the anterior extrapolation index specification (AEIspec) 131 as a combination of the anterior extrapolation index specifications (AEIs_k) for all attributes k=1 to k=Z in the listing of attributes 207 of the virtual object, as shown in Equation 10.

Also, in some embodiments, for each attribute k=1 to k=Z in the listing of attributes 207 of the virtual object, the method includes determining the posterior extrapolation index specification (PEIspec_k) for said attribute k by extrapolating along the respective attribute trendline (attspec_k) for said attribute k in the posterior direction away from the second reference index (RI2) 129-(P−1) over the distance 155, which is equal to the posterior extrapolation index percentage (PEI %) 219 of the separation distance 153 between the first reference index (RI1) 129-2 and the second reference index (RI2) 129-(P−1) along the slider bar 125 of the composition slider control 121. The method also includes determining the posterior extrapolation index specification (PEIspec) 135 as a combination of the posterior extrapolation index specifications (PEIs_k) for all attributes k=1 to k=Z in the listing of attributes 207 of the virtual object, as shown in Equation 13.

Figure 8:
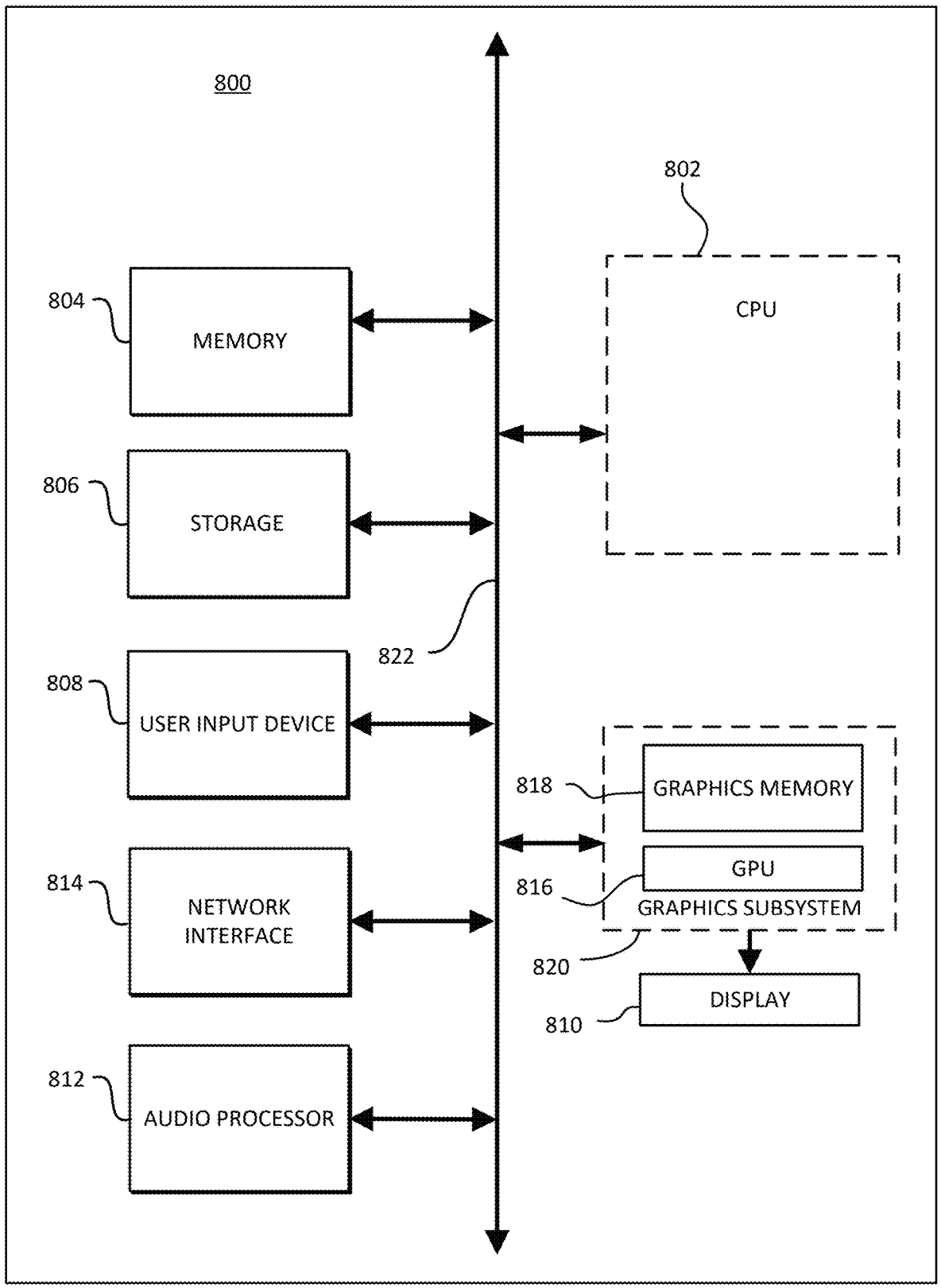
FIG. 8 shows various components of an example server device within a cloud-based computing system that can be used to perform aspects of the system and method for AI-based generation of an image of a virtual object, in accordance with some embodiments.

FIG. 8 shows various components of an example server device 800 within a cloud-based computing system that can be used to perform aspects of the system 100 and method for AI-based generation of an image of a virtual object, in accordance with some embodiments. This block diagram illustrates the server device 800 that can incorporate or can be a personal computer, video game console, personal digital assistant, a head mounted display (HMD), a wearable computing device, a laptop or desktop computing device, a server or any other digital computing device, suitable for practicing an embodiment of the disclosure. The server device (or simply referred to as "server" or "device") 800 includes a central processing unit (CPU) 802 for running software applications and optionally an operating system. The CPU 802 may be comprised of one or more homogeneous or heterogeneous processing cores. For example, the CPU 802 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 800 may be localized to a designer designing a game segment or remote from the designer (e.g., back-end server processor), or one of many servers using virtualization in the cloud-based gaming system 800 for remote use by designers.

Memory 804 stores applications and data for use by the CPU 802. Storage 806 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 808 communicate user inputs from one or more users to device 800, examples of which may include keyboards, mice, joysticks, touch pads, touch screens, still or video recorders/cameras, tracking devices for recognizing gestures, and/or microphones. Network interface 814 allows device 800 to communicate with other computer systems via an electronic communications network, and may include wired or wireless communication over local area networks and wide area networks such as the internet. An audio processor 812 is adapted to generate analog or digital audio output from instructions and/or data provided by the CPU 802, memory 804, and/or storage 806. The components of device 800, including CPU 802, memory 804, data storage 806, user input devices 808, network interface 814, and audio processor 812 are connected via one or more data buses 822.

A graphics subsystem 820 is further connected with data bus 822 and the components of the device 800. The graphics subsystem 820 includes a graphics processing unit (GPU) 816 and graphics memory 818. Graphics memory 818 includes a display memory (e.g., a frame buffer) used for storing pixel data for each pixel of an output image. Graphics memory 818 can be integrated in the same device as GPU 816, connected as a separate device with GPU 816, and/or implemented within memory 804. Pixel data can be provided to graphics memory 818 directly from the CPU 802. Alternatively, CPU 802 provides the GPU 816 with data and/or instructions defining the desired output images, from which the GPU 816 generates the pixel data of one or more output images. The data and/or instructions defining the desired output images can be stored in memory 804 and/or graphics memory 818. In an embodiment, the GPU 816 includes 3D rendering capabilities for generating pixel data for output images from instructions and data defining the geometry, lighting, shading, texturing, motion, and/or camera parameters for virtual object(s) within a scene. The GPU 816 can further include one or more programmable execution units capable of executing shader programs.

The graphics subsystem 820 periodically outputs pixel data for an image from graphics memory 818 to be displayed on display device 810. Display device 810 can be any device capable of displaying visual information in response to a signal from the device 800, including CRT, LCD, plasma, and OLED displays. In addition to display device 810, the pixel data can be projected onto a projection surface. Device 800 can provide the display device 810 with an analog or digital signal, for example.

Implementations of the present disclosure for the systems and methods for AI-based generation of images of virtual objects may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although various method operations were described in a particular order, it should be understood that other housekeeping operations may be performed in between the method operations. Also, method operations may be adjusted so that they occur at slightly different times or in parallel with each other. Also, method operations may be distributed in a system which allows the occurrence of the processing operations at various intervals associated with the processing.

One or more embodiments can also be fabricated as computer readable code (program instructions) on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices, or any other type of device that is capable of storing digital data. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

What is claimed is:

1. A system for artificial intelligence (AI)-based generation of an image of a virtual object, comprising:
   a first reference index specification for generation of a first image of a virtual object;
   a second reference index specification for generation of a second image of the virtual object;
   a specification interpolation engine configured to automatically generate an intermediate index specification for generation of an intermediate image of the virtual object by interpolating between the first reference index specification and the second reference index specification;
   an AI engine configured to generate the first image of the virtual object based on the first reference index specification, the AI engine configured to generate the second image of the virtual object based on the second reference index specification, the AI engine configured to generate the intermediate image of the virtual object based on the intermediate index specification; and
   a composition slider control enabling navigation from the first image of the virtual object through the intermediate image of the virtual object to the second image of the virtual object, the composition slider control including a handle and a slider bar, the handle slidable by a user along the slider bar, the slider bar having a plurality of indexes positioned along the slider bar, the plurality of indexes including a first reference index associated with the first reference index specification and the first image of the virtual object, the plurality of indexes including a second reference index associated with the second reference index specification and the second image of the virtual object, the plurality of indexes including at least one intermediate index respectively associated with a corresponding intermediate index specification generated by the specification interpolation engine and a corresponding intermediate image of the virtual object generated by the AI engine, the composition slider control configured to direct display of a given image of the virtual object corresponding to a given one of the plurality of indexes along the slider bar at which the handle is currently positioned.

2. The system as recited in claim 1, wherein the specification interpolation engine is configured to automatically generate the respective intermediate index specification for each of the at least one intermediate index of the plurality of indexes.

3. The system as recited in claim 1, wherein each of the first reference index specification and the second reference index specification includes a listing of attributes of the virtual object, the first reference index specification including a first specification for each attribute in the listing of attributes of the virtual object, the second reference index specification including a second specification for each attribute in the listing of attributes of the virtual object.

4. The system as recited in claim 3, further comprising:
   a control interface through which a user provides an identification of a thing represented by the virtual object, the first reference index specification, the second reference index specification, and a total number of the plurality of indexes along the slider bar.

5. The system as recited in claim 4, wherein the control interface provides for user input of the listing of attributes of the virtual object.

6. The system as recited in claim 5, further comprising:
   an attribute-level slider control interface including a respective attribute slider control for each attribute in the listing of attributes of the virtual object, each attribute slider control for a given attribute of the virtual object including a first handle, a second handle, and a slider track, the first handle slideable along the slider track for adjustment of the first specification of the given attribute, the second handle slideable along the slider track for adjustment of the second specification of the given attribute.

7. The system as recited in claim 6, wherein the specification interpolation engine is configured to automatically interpolate an adjustment of the first specification of a particular attribute of the virtual object based on an adjusted position of the first handle along the slider track of the attribute slider control for the particular attribute, and wherein the specification interpolation engine is configured to automatically interpolate an adjustment of the second specification of the particular attribute of the virtual object based on an adjusted position of the second handle along the slider track of the attribute slider control for the particular attribute.

8. The system as recited in claim 7, wherein the specification interpolation engine is configured to automatically generate an adjusted first reference index specification for generation of the first image of the virtual object based on the first specifications of the attributes of the virtual object as set through the attribute-level slider control interface, and wherein the specification interpolation engine is configured to automatically generate an adjusted second reference index specification for generation of the second image of the virtual object based on the second specifications of the attributes of the virtual object as set through the attribute-level slider control interface, and for each of the at least one intermediate index of the plurality of indexes positioned along the slider bar of the composition slider control, the specification interpolation engine configured to automatically generate a respective adjusted intermediate index specification for generation of the corresponding intermediate image of the virtual object by interpolating between the adjusted first reference index specification and the adjusted second reference index specification.

9. The system as recited in claim 8, wherein the AI engine is configured to regenerate the first image of the virtual object based on the adjusted first reference index specification, and wherein the AI engine is configured to regenerate the second image of the virtual object based on the adjusted second reference index specification, and for each of the at least one intermediate index of the plurality of indexes positioned along the slider bar of the composition slider control, the AI engine is configured to regenerate the corresponding intermediate image of the virtual object based on the respective adjusted intermediate index specification.

10. The system as recited in claim 5, wherein the control interface provides for user input of an anterior extrapolation index percentage, the specification interpolation engine configured to automatically generate an anterior extrapolation index specification for generation of an anterior extrapolation image of the virtual object based on the anterior extrapolation index percentage, the AI engine configured to generate the anterior extrapolation image of the virtual object based on the anterior extrapolation index specification, the plurality of indexes positioned along the slider bar of the composition slider control including an anterior extrapolation index associated with the anterior extrapolation index specification and the anterior extrapolation image of the virtual object, and wherein the control interface provides for user input of a posterior extrapolation index percentage, the specification interpolation engine configured to automatically generate a posterior extrapolation index specification for generation of a posterior extrapolation image of the virtual object based on the posterior extrapolation index percentage, the AI engine configured to generate the posterior extrapolation image of the virtual object based on the posterior extrapolation index specification, the plurality of indexes positioned along the slider bar of the composition slider control including a posterior extrapolation index associated with the posterior extrapolation index specification and the posterior extrapolation image of the virtual object.

11. The system as recited in claim 10, wherein, for each attribute in the listing of attributes of the virtual object, the specification interpolation engine is configured to determine a respective attribute specification trendline for said attribute between the first reference index specification for said attribute and the second reference index specification for said attribute, the specification interpolation engine configured to determine an anterior extrapolation index specification for said attribute by extrapolating along the respective attribute specification trendline for said attribute in an anterior direction away from the first reference index over a distance equal to the anterior extrapolation index percentage of a separation distance between the first reference index and the second reference index along the slider bar of the composition slider control, the anterior extrapolation index specification being a combination of the anterior extrapolation index specifications for all attributes in the listing of attributes of the virtual object, and wherein, for each attribute in the listing of attributes of the virtual object, the specification interpolation engine is configured to determine a posterior extrapolation index specification for said attribute by extrapolating along the respective attribute specification trendline for said attribute in a posterior direction away from the second reference index over a distance equal to the posterior extrapolation index percentage of the separation distance between the first reference index and the second reference index along the slider bar of the composition slider control, the posterior extrapolation index specification being a combination of the posterior extrapolation index specifications for all attributes in the listing of attributes of the virtual object.

12. The system as recited in claim 1, wherein the AI engine is configured to generate an interpolated image of the virtual object from two neighboring AI engine-generated images of the virtual object when the handle of the composition slider control is positioned between two neighboring indexes of the plurality of indexes positioned along the slider bar of the composition slider control, the two neighboring AI engine-generated images of the virtual object respectively corresponding to the two neighboring indexes.

13. A method for artificial intelligence (AI)-based generation of an image of a virtual object, comprising:

receiving a first reference index specification for generation of a first image of a virtual object;

receiving a second reference index specification for generation of a second image of the virtual object;

automatically generating an intermediate index specification for generation of an intermediate image of the virtual object by interpolating between the first reference index specification and the second reference index specification;

executing an AI engine to generate the first image of the virtual object based on the first reference index specification;

executing the AI engine to generate the second image of the virtual object based on the second reference index specification;

executing the AI engine to generate the intermediate image of the virtual object based on the intermediate index specification;

generating a composition slider control for navigation from the first image of the virtual object through the intermediate image of the virtual object to the second image of the virtual object, the composition slider control including a handle and a slider bar, the handle slidable by a user along the slider bar, the slider bar having a plurality of indexes positioned along the slider bar, the plurality of indexes including a first reference index associated with the first reference index specification and the first image of the virtual object, the plurality of indexes including a second reference index associated with the second reference index specification and the second image of the virtual object, the plurality of indexes including at least one intermediate index respectively associated with a corresponding intermediate index specification generated by the specification interpolation engine and a corresponding intermediate image of the virtual object generated by the AI engine; and displaying a given image of the virtual object corresponding to a given one of the plurality of indexes along the slider bar of the composition slider control at which the handle of the composition slider control is currently positioned.

14. The method as recited in claim 13, further comprising: automatically generating a respective intermediate index specification for each of multiple intermediate indexes of the plurality of indexes.

15. The method as recited in claim 13, wherein each of the first reference index specification and the second reference index specification includes a listing of attributes of the virtual object, the first reference index specification including a first specification for each attribute in the listing of attributes of the virtual object, the second reference index specification including a second specification for each attribute in the listing of attributes of the virtual object.

16. The method as recited in claim 15, further comprising:
receiving an identification of a thing represented by the virtual object;
receiving a value indicating a total number of the plurality of indexes along the slider bar; and
receiving an input of a listing of attributes of the virtual object.

17. The method as recited in claim 16, further comprising:
providing a set of attribute-level slider controls including a respective attribute slider control for each attribute in the listing of attributes of the virtual object, each attribute slider control for a given attribute of the virtual object including a first handle, a second handle, and a slider track, the first handle slideable along the slider track for adjustment of the first specification of the given attribute, the second handle slideable along the slider track for adjustment of the second specification of the given attribute.

18. The method as recited in claim 17, further comprising:
detecting an adjusted position of the first handle along the slider track of the attribute slider control for a particular attribute;
automatically interpolating an adjustment of the first specification of the particular attribute of the virtual object based on the adjusted position of the first handle along the slider track of the attribute slider control for the particular attribute;
detecting an adjusted position of the second handle along the slider track of the attribute slider control for the particular attribute; and
automatically interpolating an adjustment of the second specification of the particular attribute of the virtual object based on the adjusted position of the second handle along the slider track of the attribute slider control for the particular attribute.

19. The method as recited in claim 18, further comprising:
automatically generating an adjusted first reference index specification for generation of the first image of the virtual object based on the first specifications of the attributes of the virtual object as specified through the set of attribute-level slider controls;
automatically generating an adjusted second reference index specification for generation of the second image of the virtual object based on the second specifications of the attributes of the virtual object as specified through the set of attribute-level slider controls; and
for each of the at least one intermediate index of the plurality of indexes positioned along the slider bar of the composition slider control, automatically generating a respective adjusted intermediate index specification for generation of the corresponding intermediate image of the virtual object by interpolating between the adjusted first reference index specification and the adjusted second reference index specification.

20. The method as recited in claim 19, further comprising:
executing the AI engine to regenerate the first image of the virtual object based on the adjusted first reference index specification;
executing the AI engine to regenerate the second image of the virtual object based on the adjusted second reference index specification; and
for each of the at least one intermediate index of the plurality of indexes positioned along the slider bar of the composition slider control, executing the AI engine to regenerate the corresponding intermediate image of the virtual object based on the respective adjusted intermediate index specification.

21. The method as recited in claim 16, further comprising:
receiving a value indicating an anterior extrapolation index percentage;
automatically generating an anterior extrapolation index specification for generation of an anterior extrapolation image of the virtual object based on the anterior extrapolation index percentage;
executing the AI engine to generate the anterior extrapolation image of the virtual object based on the anterior extrapolation index specification, the plurality of indexes positioned along the slider bar of the composition slider control including an anterior extrapolation index associated with the anterior extrapolation index specification and the anterior extrapolation image of the virtual object;
receiving a value indicating a posterior extrapolation index percentage;
automatically generating a posterior extrapolation index specification for generation of a posterior extrapolation image of the virtual object based on the posterior extrapolation index percentage; and
executing the AI engine to generate the posterior extrapolation image of the virtual object based on the posterior extrapolation index specification, the plurality of indexes positioned along the slider bar of the composition slider control including a posterior extrapolation index associated with the posterior extrapolation index specification and the posterior extrapolation image of the virtual object.

22. The method as recited in claim 21, further comprising:
for each attribute in the listing of attributes of the virtual object, determining a respective attribute trendline for said attribute between the first reference index specification for said attribute and the second reference index specification for said attribute;
for each attribute in the listing of attributes of the virtual object, determining an anterior extrapolation index specification for said attribute by extrapolating along the respective attribute trendline for said attribute in an anterior direction away from the first reference index over a distance equal to the anterior extrapolation index percentage of a separation distance between the first reference index and the second reference index along the slider bar of the composition slider control;
determining the anterior extrapolation index specification as a combination of the anterior extrapolation index specifications for all attributes in the listing of attributes of the virtual object;
for each attribute in the listing of attributes of the virtual object, determining a posterior extrapolation index specification for said attribute by extrapolating along the respective attribute trendline for said attribute in a posterior direction away from the second reference index over a distance equal to the posterior extrapolation index percentage of the separation distance between the first reference index and the second reference index along the slider bar of the composition slider control; and
determining the posterior extrapolation index specification as a combination of the posterior extrapolation index specifications for all attributes in the listing of attributes of the virtual object.

23. The method as recited in claim 13, further comprising:
executing the AI engine to generate an interpolated image of the virtual object from two neighboring AI engine-generated images of the virtual object when the handle of the composition slider control is positioned between two neighboring indexes of the plurality of indexes positioned along the slider bar of the composition slider control, the two neighboring AI engine-generated images of the virtual object respectively corresponding to the two neighboring indexes.

* * * * *